(12) United States Patent
Omura et al.

(10) Patent No.: US 12,475,343 B2
(45) Date of Patent: Nov. 18, 2025

(54) MOBILE CODE READING DEVICE AND CODE READING METHOD

(71) Applicant: KEYENCE CORPORATION, Osaka (JP)

(72) Inventors: Yuta Omura, Osaka (JP); Kosuke Yanai, Osaka (JP); Yoshiyuki Fukumoto, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 18/409,075

(22) Filed: Jan. 10, 2024

(65) Prior Publication Data
US 2024/0273320 A1   Aug. 15, 2024

(30) Foreign Application Priority Data
Feb. 10, 2023   (JP) .................................. 2023-019189

(51) Int. Cl.
*G06K 7/10*   (2006.01)
(52) U.S. Cl.
CPC ................................ *G06K 7/10742* (2013.01)
(58) Field of Classification Search
CPC .. G06K 7/10742; G06K 7/10; G06K 7/10732; G06K 7/10831; G06K 7/10881; G06K 2007/10524
See application file for complete search history.

(56) References Cited

U.S. PATENT DOCUMENTS

| | | | |
|---|---|---|---|
| 7,537,164 B2 | 5/2009 | Joseph et al. | |
| 7,852,519 B2 | 12/2010 | Meier et al. | |
| 2006/0006231 A1 | 1/2006 | Anson et al. | |
| 2014/0263645 A1* | 9/2014 | Smith | G06K 7/10722 |
| | | | 235/440 |
| 2021/0111580 A1 | 4/2021 | Barkan et al. | |

OTHER PUBLICATIONS

Related co-pending U.S. Appl. No. 18/409,028, filed Jan. 10, 2024, counterpart Japanese Patent Application No. 2023-019186.
Related co-pending U.S. Appl. No. 18/409,115, filed Jan. 10, 2024, counterpart Japanese Patent Application No. 2023-019190.
Related co-pending U.S. Appl. No. 18/409,229, filed Jan. 10, 2024, counterpart Japanese Patent Application No. 2023-019188.

* cited by examiner

*Primary Examiner* — Matthew Mikels
(74) *Attorney, Agent, or Firm* — WHDA, LLP

(57) ABSTRACT

A light source is suppressed from being reflected on a workpiece surface of a specular workpiece. A code reading device generates a code image by receiving light specularly reflected from a specular workpiece surface of light emitted from a diffuser and diffusing and reflecting light emitted to a portion corresponding to a code. A position and an angle of the diffuser are fixed with respect to a camera such that the specularly reflected light from the workpiece surface is received by the camera in a state where the camera is in focus on the workpiece surface, and the light source emits the light from the back of a rear end of the diffuser toward the diffuser such that the light source is not reflected on the camera when the camera receives the specularly reflected light.

13 Claims, 15 Drawing Sheets

MOBILE CODE READING DEVICE AND CODE READING METHOD

CROSS-REFERENCE TO RELATED APPLICATIONS

The present application claims foreign priority based on Japanese Patent Application No. 2023-019189, filed Feb. 10, 2023, the contents of which are incorporated herein by reference.

BACKGROUND OF THE INVENTION

1. Technical Field

The invention relates to a code reading technique for irradiating a workpiece surface, provided with a code, with light and receiving the light reflected from the workpiece surface by a camera to generate a code image.

2. Description of the Related Art

U.S. Pat. No. 7,537,164 describes a barcode reader that reads a barcode.

The barcode reader diffuses light emitted from a light source, such as an LED, by a diffuser to irradiate the barcode with the light made uniform.

Meanwhile, when the light source and the diffuser are close to each other, the light source is reflected on a specular workpiece surface, and thus, a code image in which the light source has appeared in a place where a code should appear is sometimes generated.

SUMMARY OF THE INVENTION

The invention has been made in view of the above problem, and an object thereof is to suppress a reflection of a light source on a code image when the code image is generated using light emitted from the light source and then diffused by a diffuser.

According to one embodiment of the invention, a portable code reading device is a portable code reading device that generates a code image by irradiating a specular workpiece surface to which a code is attached with planar light, receiving light specularly reflected by the workpiece surface, and diffusing and reflecting light emitted to a portion corresponding to the code, and includes: a first light source; a condenser lens that collects light reflected by the workpiece surface; a first camera that receives the light collected by the condenser lens and generates the code image; and a diffuser having an inclined shape that gradually expands as a distance from the first camera increases, the diffuser diffusing light emitted from the first light source to emit diffuse light toward the workpiece surface. A position and an angle of the diffuser are fixed with respect to the first camera to allow the first camera to receive the specularly reflected light from the workpiece surface in a state where the first camera is in focus on the workpiece surface. The first light source emits the light toward the diffuser from a back or a front of a rear end of the diffuser or irradiates the diffuser with the light via a reflector provided on an optical path between the first light source and the diffuser to prevent the light source from being reflected on the first camera when the first camera receives the specularly reflected light.

According to one embodiment of the invention, a code reading method is a code reading method for generating a code image by irradiating a specular workpiece surface to which a code is attached with planar light, receiving light specularly reflected by the workpiece surface, and diffusing and reflecting light emitted to a portion corresponding to the code, and includes: a step of causing light emitted from a first light source to be incident on a diffuser; a step of causing the diffuser to diffuse the light; a step of irradiating the workpiece surface with the light diffused by the diffuser; a step of collecting, by a condenser lens, the light reflected by the workpiece surface; and a step of receiving the light collected by the condenser lens to generate the code image. The diffuser has an inclined shape that gradually expands as a distance from the first camera increases, and diffuses the light emitted from the first light source to emit diffuse light toward the workpiece surface. A position and an angle of the diffuser are fixed with respect to the first camera to allow the first camera to receive the specularly reflected light from the workpiece surface in a state where the first camera is in focus on the workpiece surface. The first light source emits the light toward the diffuser from a back or a front of a rear end of the diffuser or irradiates the diffuser with the light via a reflector provided on an optical path between the first light source and the diffuser to prevent the light source from being reflected on the first camera when the first camera receives the specularly reflected light.

In the invention configured as described above, it is possible to suppress the reflection of the light source on the light emitted from the light source and then diffused by the diffuser.

DETAILED DESCRIPTION

Figure 1:
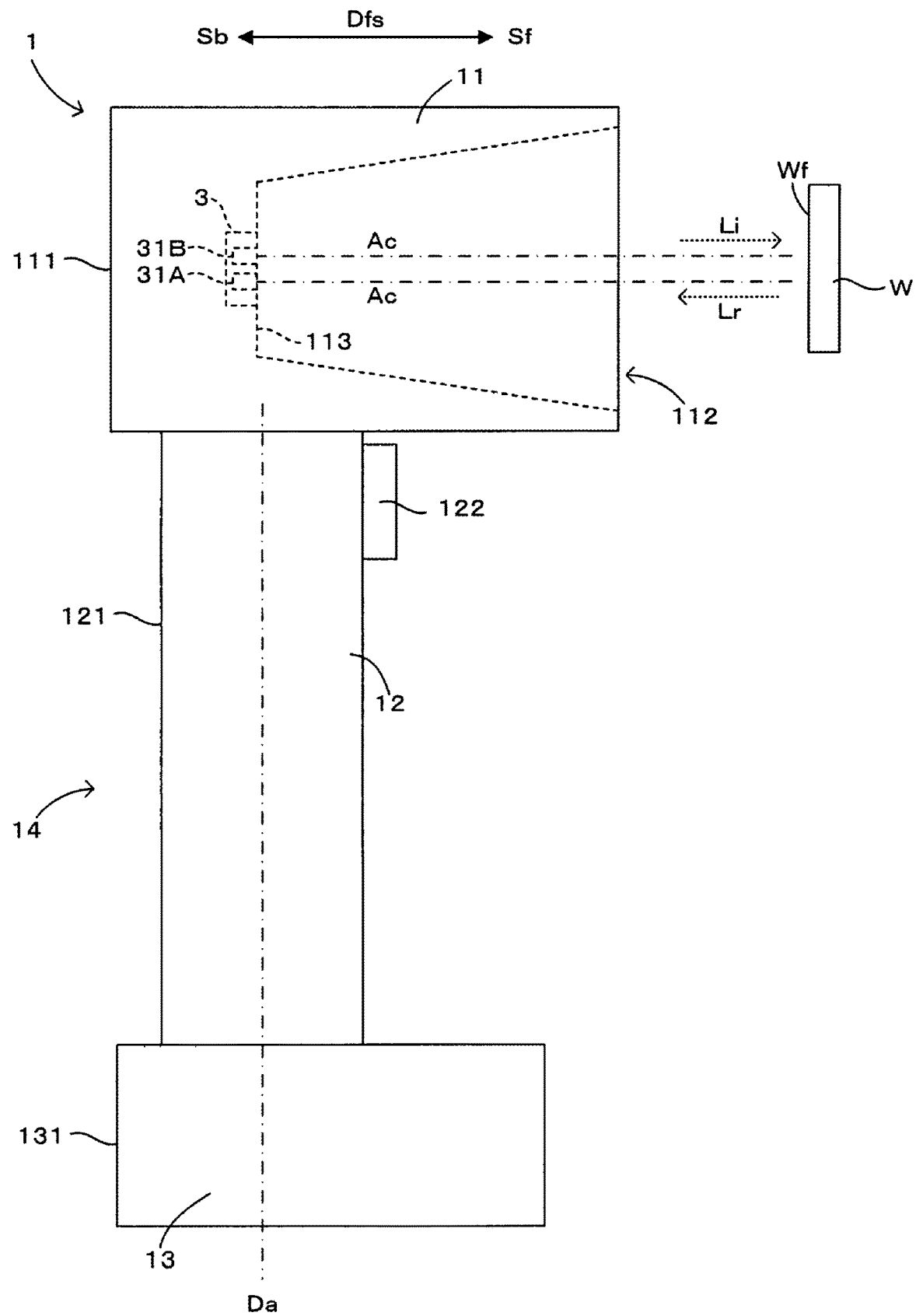
FIG. 1 is a side view schematically illustrating a configuration of a code reading device.
Figure 2:
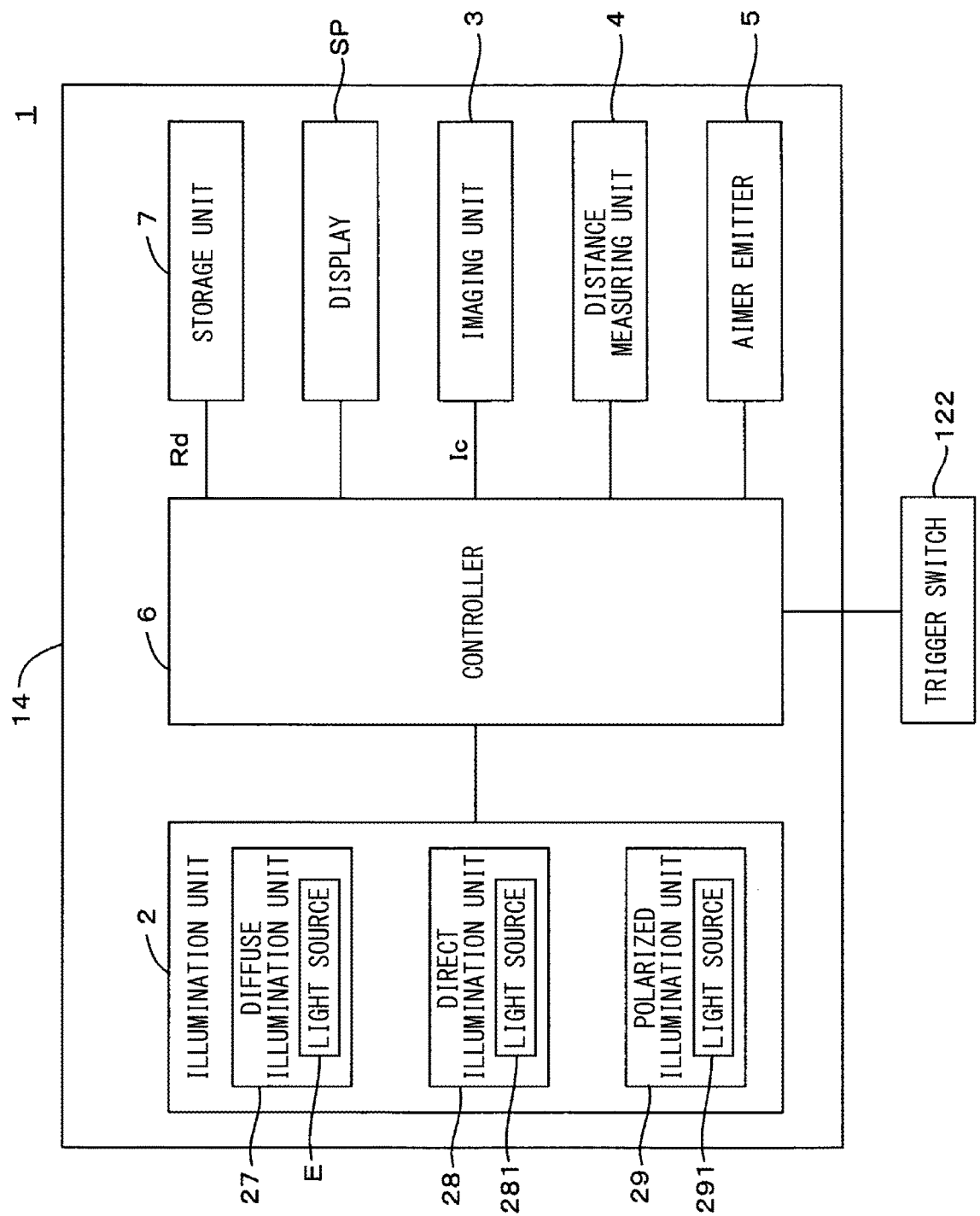
FIG. 2 is a block diagram schematically illustrating an electrical configuration of the code reading device of FIG. 1.

FIG. 1 is a side view schematically illustrating a configuration of a code reading device, and FIG. 2 is a block diagram schematically illustrating an electrical configuration of the code reading device of FIG. 1. Here, in a state where a code reading device 1 faces a surface Wf of a workpiece W in order to read a code attached to the surface Wf of the workpiece W by the code reading device 1, a front-rear direction Dfs is appropriately illustrated with a side closer to the workpiece W with respect to the code reading device 1 as a front side Sf and an opposite side of the workpiece W with respect to the code reading device 1 as a rear side Sb.

As illustrated in FIG. 1, the code reading device 1 includes a head 11, a grip 12, and a grip end 13. The grip 12 extends in an axial direction Da intersecting the front-rear direction Dfs between the head 11 and the grip end 13. In other words, the head 11 is provided at one end of the grip 12, and the grip end 13 is provided at the other end (end opposite to the one end) of the grip 12. The head 11 has a head body 111, the grip 12 has a grip body 121, the grip end 13 has a grip end body 131, and the head body 111, the grip body 121, and the grip end body 131 constitute a housing 14 that houses each unit incorporated in the code reading device 1. A user can carry the code reading device 1 by grasping the grip body 121 of the code reading device 1.

The head body 111 of the head 11 has an opening 112 opened to the front side Sf, and an arrangement panel 113 is provided at an end on the rear side Sb (in other words, the back side) of the opening 112. During code reading, the opening 112 faces the surface Wf of the workpiece W, and the arrangement panel 113 faces the surface Wf of the workpiece W through the opening 112. In addition, the head 11 includes an illumination unit 2, an imaging unit 3, a distance measuring unit 4, an aimer emitter 5, and a display SP illustrated in FIG. 2. The illumination unit 2, the imaging unit 3, the distance measuring unit 4, the aimer emitter 5, and the display SP are housed in the head 11. In particular, a part of the illumination unit 2, the imaging unit 3, the distance measuring unit 4, and the aimer emitter 5 are provided on the arrangement panel 113.

The illumination unit 2 irradiates the surface Wf of the workpiece W with illumination light Li, and the imaging unit 3 captures an image of reflected light Lr from the surface Wf of the workpiece W with a camera 31A or 31B to generate a code image Ic. The illumination light Li is emitted from the illumination unit 2 to the surface Wf of the workpiece W through the opening 112, the reflected light Lr is generated as the illumination light Li is reflected from the surface Wf of the workpiece W, and the reflected light Lr is incident on the camera 31A or 31B of the imaging unit 3 from the surface Wf of the workpiece W through the opening 112.

The illumination unit 2 includes a diffuse illumination unit 27, a direct illumination unit 28, and a polarized illumination unit 29. The diffuse illumination unit 27 has a light source E, and diffuses light emitted from the light source E and irradiates the surface Wf of the workpiece W with the diffuse light. The direct illumination unit 28 includes a light source 281, and directly irradiates the surface Wf of the workpiece W with light emitted from the light source 281 without diffusing the light. The polarized illumination unit 29 includes a light source 291, polarizes light emitted from the light source 291, and irradiates the surface Wf of the workpiece W with the polarized light. Details of the illumination unit 2 will be described later.

The imaging unit 3 includes two cameras 31A and 31B. Each of the cameras 31A and 31B collects the reflected light Lr on a solid-state imaging element by a condenser lens which is an objective lens facing the surface Wf of the workpiece W. The solid-state imaging element receives the reflected light Lr collected by the condenser lens to generate the code image Ic.

The distance measuring unit 4 measures time until light emitted from the distance measuring unit 4 to the surface Wf of the workpiece W through the opening 112 is reflected by the surface Wf of the workpiece W and returns to the distance measuring unit 4 through the opening 112, thereby measuring a distance to the surface Wf of the workpiece W. The aimer emitter 5 emits visible light (aimer) indicating a reading position of the code reading device 1 to the surface Wf of the workpiece W through the opening 112. The display SP displays information to the user.

The grip 12 includes a trigger switch 122 provided on the front side Sf of the grip body 121. The user can operate the trigger switch 122 with a finger while gripping the grip body 121 with a hand.

In addition, the code reading device 1 includes a controller 6 that controls each unit of the code reading device 1 and a storage unit 7 that stores data to be used in the code reading device 1 and generated data. The controller 6 and the storage unit 7 are housed in the housing 14. The controller 6 is a processor, that is, a central processing unit (CPU). The storage unit 7 is a storage device such as a read only memory (ROM) or a random access memory (RAM).

The controller 6 causes the illumination unit 2 to execute an illumination operation of irradiating the surface Wf of the workpiece W with the illumination light Li, and causes the imaging unit 3 to execute an imaging operation of receiving the reflected light Lr by the solid-state imaging element to generate the code image Ic. Furthermore, the controller 6 acquires the code image Ic generated by the imaging unit 3 and decodes the code image Ic. In this manner, code reading is executed by a series of operations such as the illumination operation by the illumination unit 2, the imaging operation by the imaging unit 3, and the decoding by the controller 6. For example, the controller 6 executes the code reading when sensing that the trigger switch 122 is operated by the user. A decoding result Rd which is a result of the code reading, that is, a result of the decoding of the code image Ic by the controller 6 is stored in the storage unit 7.

Figure 3:
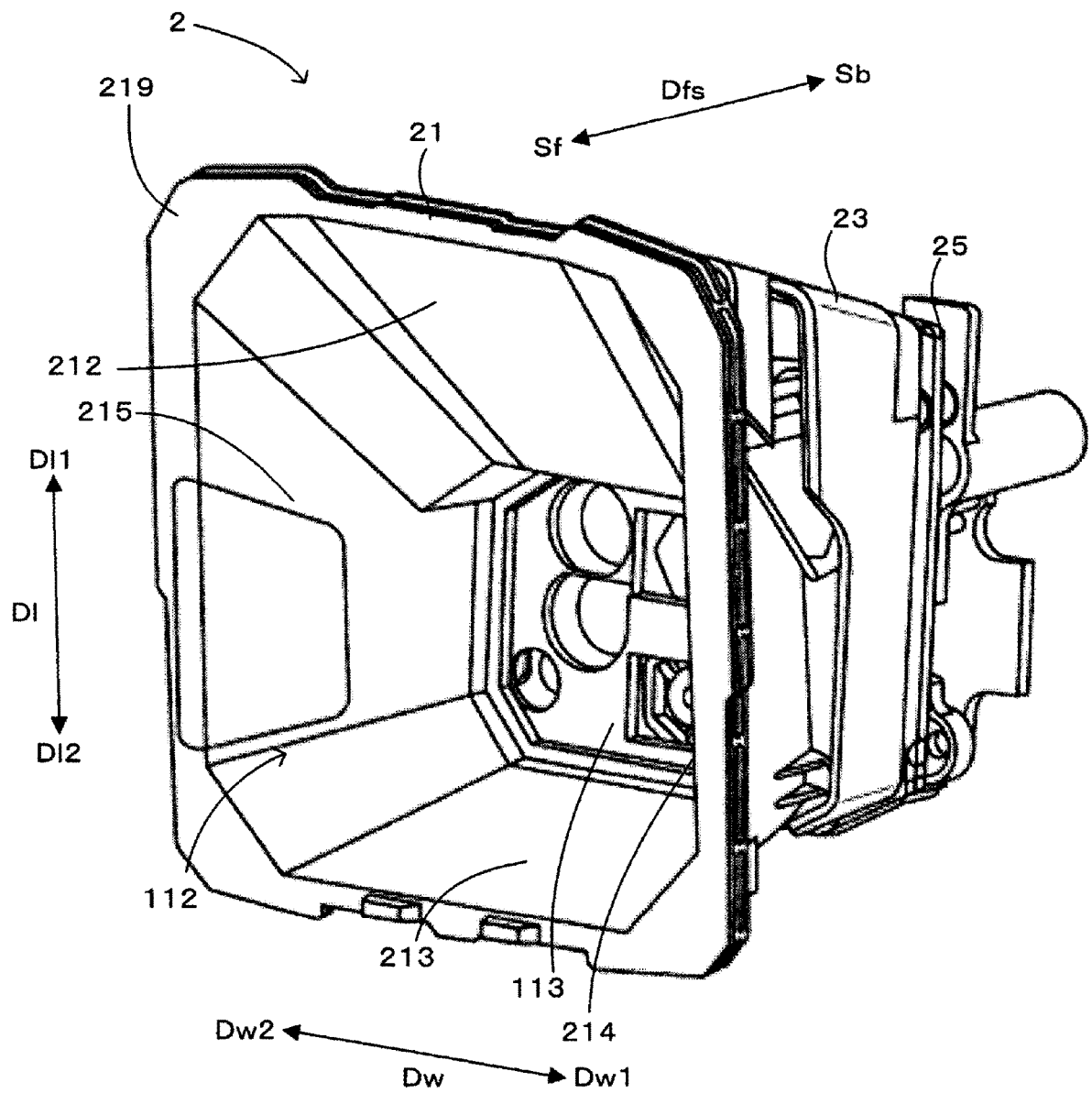
FIG. 3 is a perspective view illustrating a specific exterior configuration of a head.
Figure 4:
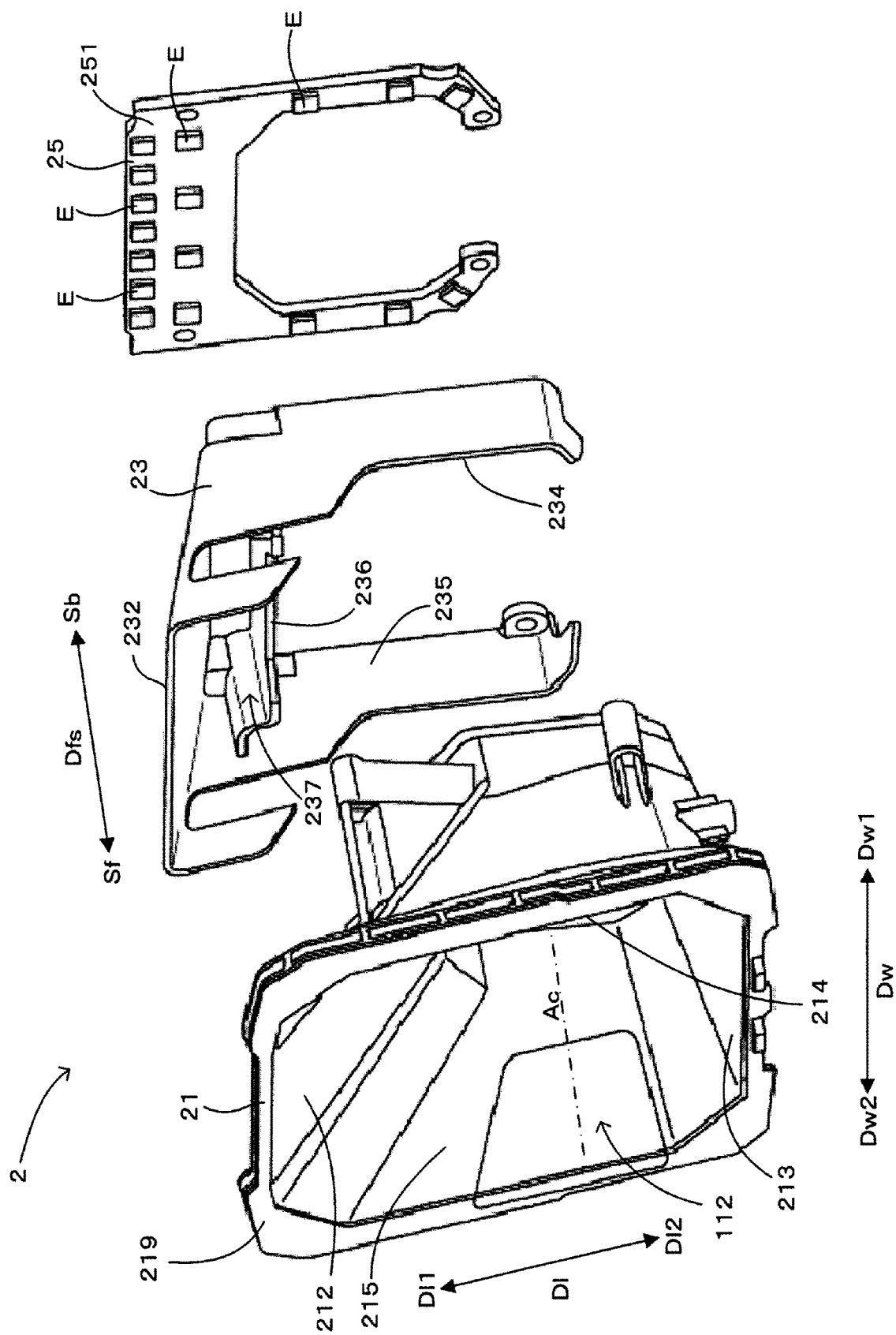
FIG. 4 is an exploded perspective view illustrating a specific configuration related to an illumination unit provided in the head in an exploded manner.

Next, a configuration of the head 11, particularly a configuration of the illumination unit 2 provided in the head 11 will be described in detail. FIG. 3 is a perspective view illustrating a specific exterior configuration of the head, and FIG. 4 is an exploded perspective view illustrating a specific configuration of the illumination unit provided in the head in an exploded manner. In FIGS. 3 and 4, a length direction Dl and a width direction Dw are illustrated. Here, the length direction Dl and the width direction Dw are orthogonal to each other and intersect the front-rear direction Dfs. In addition, one side Dl1 in the length direction Dl (a side from the grip end 13 toward the head 11) and the other side Dl2 in the length direction Dl (a side opposite to the one side Dl1) are illustrated, and one side Dw1 in the width direction Dw and the other side Dw2 in the width direction Dw (a side opposite to the one side Dw1) are illustrated.

The illumination unit 2 includes a diffuser 21, a reflector 23 attached to the diffuser 21 from the rear side Sb, and an illumination substrate 25 attached to the reflector 23 from the rear side Sb. The diffuser 21 and the reflector 23 constitute a part of the head 11 described above.

The diffuser 21 has an opening defining portion which is a wall surface surrounding the above-described opening 112 opened to the front side Sf. The opening defining portion has a top diffusion plate 212 provided on the one side Dl1 of the opening 112 and a bottom diffusion plate 213 provided on the other side Dl2 of the opening 112 in the length direction Dl. Furthermore, the opening defining portion includes a right diffusion plate 214 provided on the one side Dl1 of the opening 112 and a left diffusion plate 215 provided on the other side Dl2 of the opening 112 in the width direction Dw. End portions of the top diffusion plate 212 on both the sides in the width direction Dw are bent to the other side Dl2 toward the right diffusion plate 214 and the left diffusion plate 215. In addition, in the length direction Dl, an end portion of the right diffusion plate 214 on the other side Dl2 is bent to the other side Dw2 toward the bottom diffusion plate 213, and an end portion of the left diffusion plate 215 on the other side Dl2 is bent to the one side Dw1 toward the bottom diffusion plate 213.

The top diffusion plate 212, the right diffusion plate 214, and the left diffusion plate 215 diffuse light transmitted from the rear side Sb to the front side Sf, and emit the light to the front side Sf. Specifically, a back surface (light incident surface) on the rear side Sb of each of the top diffusion plate 212, the right diffusion plate 214, and the left diffusion plate 215 is roughened, and the light is diffused by the textured back surface. However, a configuration for causing the top diffusion plate 212, the bottom diffusion plate 213, the right diffusion plate 214, and the left diffusion plate 215 to have a light diffusion function is not limited to roughening, and for example, the light diffusion function may be provided by using a milky white material having a high diffusibility.

Each of the plates 212, 213, 214, and 215 defining the opening 112 has an inclined shape (a tapered shape in the present embodiment) inclined with respect to the front-rear direction Dfs such that the area of the opening 112 in a cross section intersecting the optical axis Ac of the condenser lens 311A (FIGS. 5D, 5E, and 5F) of the camera 31A increases toward the front side Sf in the front-rear direction Dfs. In other words, each of the plates 212, 213, 214, and 215 has a tapered shape inclined with respect to the optical axis so as to be separated from the optical axis Ac toward the front side Sf (the workpiece W side) in an optical axis direction. Note that the shape of each of the plates 212, 213, 214, and 215 inclined with respect to the optical axis is not limited to a straight tapered shape, and may be a curved shape.

In addition, the diffuser 21 has a flange 219 protruding outward from an end of each of the plates 212, 213, 214, and 215 on the front side Sf. That is, the flange 219 is provided on a peripheral edge of the opening 112 when viewed from the front side Sf.

The illumination substrate 25 is arranged on the rear side Sb with respect to the plates 212, 213, 214, and 215 each having the tapered shape as described above. The illumination substrate 25 includes a substrate 251 and a plurality of light sources E arrayed on a surface of the substrate 251 on the front side Sf. The light source E is, for example, a light emitting diode (LED), and emits light to the front side Sf toward the top diffusion plate 212, the right diffusion plate 214, or the left diffusion plate 215. The light emitted from the light source E and incident on the top diffusion plate 212, the right diffusion plate 214, or the left diffusion plate 215 from the rear side Sb is diffused as passing through the diffusion plate 212, 214, or 215, and is emitted from the diffusion plate 212, 214, or 215 to the front side Sf.

The reflector 23 is arranged between the diffuser 21 and the illumination substrate 25 in the front-rear direction Dfs. The reflector 23 includes a top cover 232 that covers a path of light emitted from the light source E of the illumination substrate 25 toward the diffuser 21 from the one side Dl1 in the length direction Dl, a right cover 234 that covers the path of the light from the one side Dw1 in the width direction Dw, and a left cover 235 that covers the path of the light from the other side Dw2 in the width direction Dw. Each of the top cover 232, the right cover 234, and the left cover 235 extends from the illumination substrate 25 to the front side Sf in the front-rear direction Dfs. In particular, the top cover 232 extends from the illumination substrate 25 to an end portion on the one side Dl1 of the flange 219 of the diffuser 21. The top cover 232, the right cover 234, and the left cover 235 reflect light.

Furthermore, the reflector 23 includes a partition plate 236 provided on the other side Dl2 of the top cover 232 in the length direction Dl. The partition plate 236 extends from the illumination substrate 25 to the front side Sf in the front-rear direction Dfs. The partition plate 236 extends between the right cover 234 and the left cover 235 in the width direction Dw, and a slit 237 (a gap) is provided between the top cover 232 and the partition plate 236 in the length direction Dl.

Figure 5A:
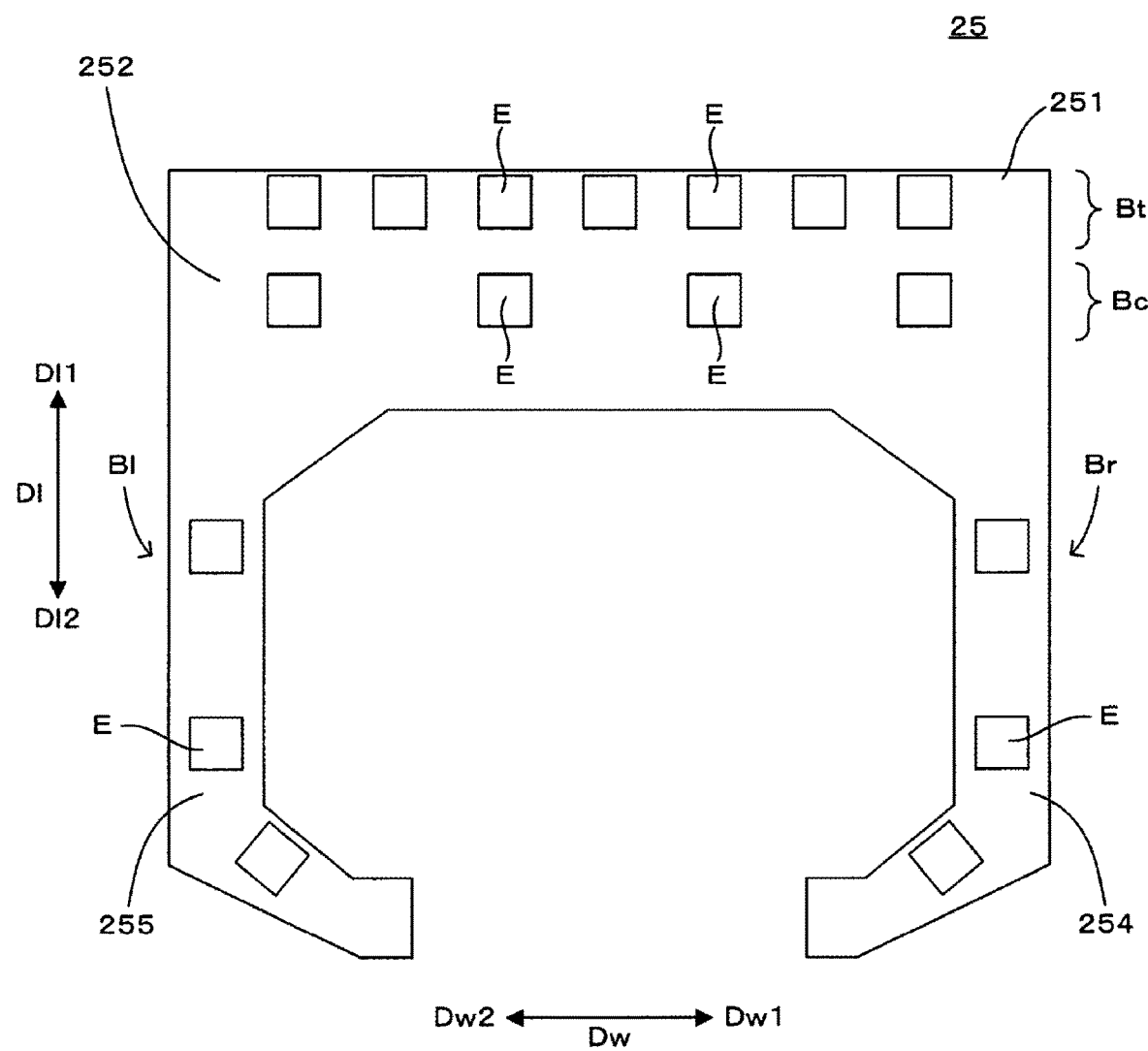
FIG. 5A is a front view schematically illustrating a configuration of an illumination substrate.

FIG. 5A is a front view schematically illustrating a configuration of the illumination substrate. As illustrated in FIG. 5A, the substrate 251 includes a main substrate portion 252 extending in the width direction Dw, a right substrate portion 254 extending from an end portion of the main substrate portion 252 on the one side Dw1 to the other side Dl2 in the length direction Dl, and a left substrate portion 255 extending from an end portion of the main substrate portion 252 on the other side Dw2 to the other side Dl2 in the length direction Dl.

The main substrate portion 252 is provided with a top light source region Bt provided with a predetermined width in the width direction Dw and a center light source region Bc provided with a predetermined width in the width direction Dw on the other side Dl2 of the length direction Dl with respect to the top light source region Bt. A plurality of light sources E are arrayed in the width direction Dw at a predetermined pitch (top pitch) in the top light source region Bt, and a plurality of light sources E are arrayed in the width direction Dw at a center pitch, longer than the top pitch, in the center light source region Bc. Due to such a difference between the pitches, the number of the light sources E arrayed in the top light source region Bt is larger than the number of the light sources E arrayed in the center light source region Bc. With this configuration, uniformity between the amount of light incident on the top diffusion plate 212 from the top light source region Bt and the amount of light incident on the top diffusion plate 212 from the center light source region Bt located closer to the top diffusion plate 212 than the top light source region Bt is improved (see FIG. 7 to be described later). Note that the center pitch is twice the top pitch in this example, but a specific ratio of these pitches is not limited thereto.

An end portion of the right substrate portion 254 on the other side Dl2 is bent to the other side Dw2 in the width direction Dw. In addition, the right substrate portion 254 is provided with a right light source region Br along a shape of the right substrate portion 254, and a plurality of light sources E are arrayed in the right light source region Br. The number of the light sources E arrayed in the right light source region Br is smaller than the number of the light sources E arrayed in the top light source region Bt, and is smaller than the number of the light sources E arrayed in the center light source region Bc.

An end portion of the left substrate portion 255 on the other side Dl2 is bent to the one side Dw1 in the width direction Dw. In addition, the left substrate portion 255 is provided with a left light source region Bl along a shape of the left substrate portion 255, and a plurality of light sources E are arrayed in the left light source region Bl. The number of the light sources E arrayed in the left light source region Bl is equal to the number of the light sources E arrayed in the right light source region Br.

Figure 5B:
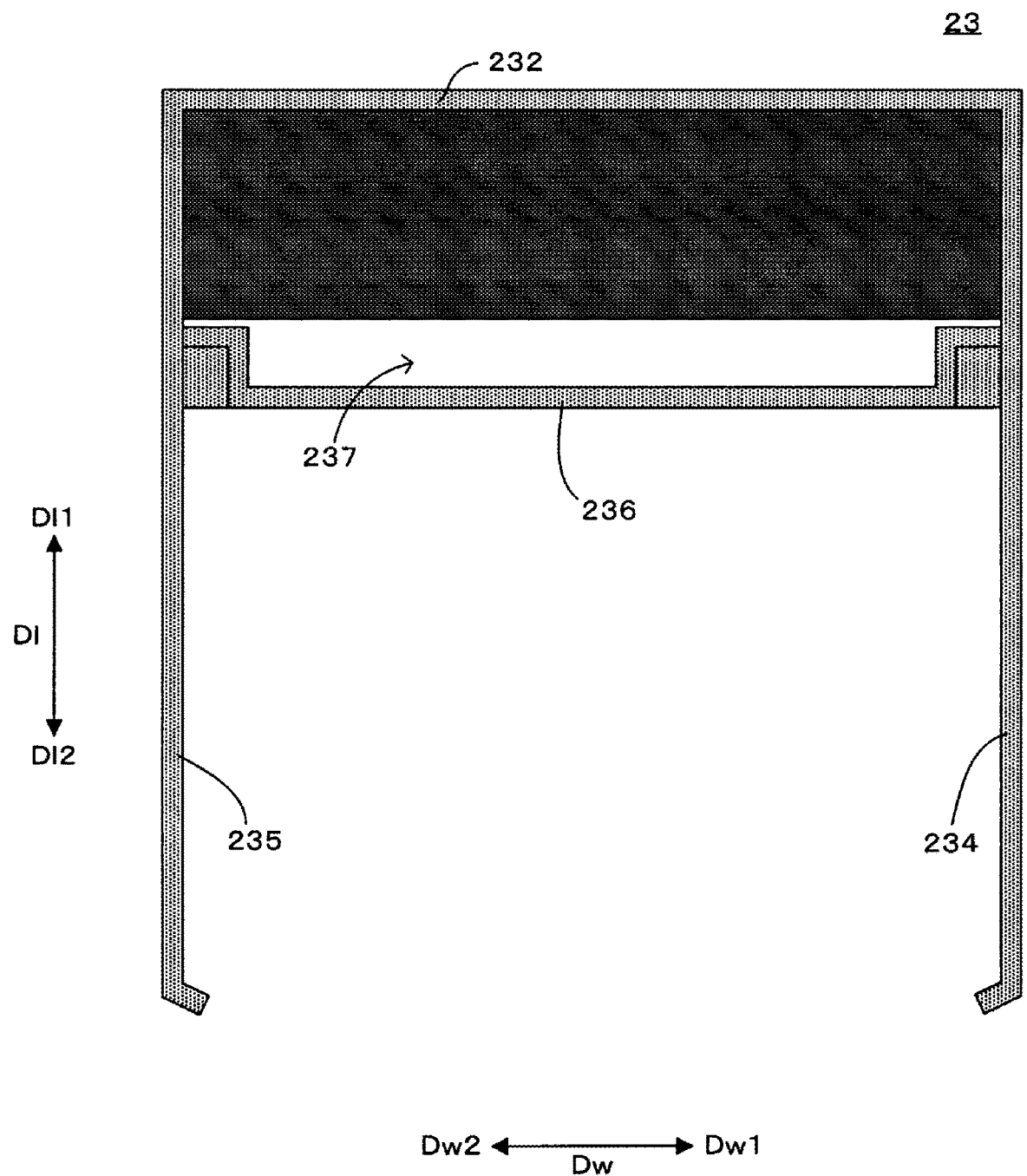
FIG. 5B is a front view schematically illustrating a configuration of a reflector.

FIG. 5B is a front view schematically illustrating a configuration of the reflector. As described above, the reflector 23 includes the top cover 232, the right cover 234, and the left cover 235. The top cover 232 extends in the width direction Dw, the right cover 234 extends from an end of the top cover 232 on the one side Dw1 in the width direction Dw to the other side Dl2 in the length direction Dl, and the left cover 235 extends from an end of the top cover 232 on the other side Dw2 in the width direction Dw to the other side Dl2 in the length direction Dl. Furthermore, the reflector 23 includes the partition plate 236 extending in the width direction Dw between the right cover 234 and the left cover 235, and the slit 237 having a rectangular shape and formed between the top cover 232 and the partition plate 236 in the length direction Dl.

Figure 5C:
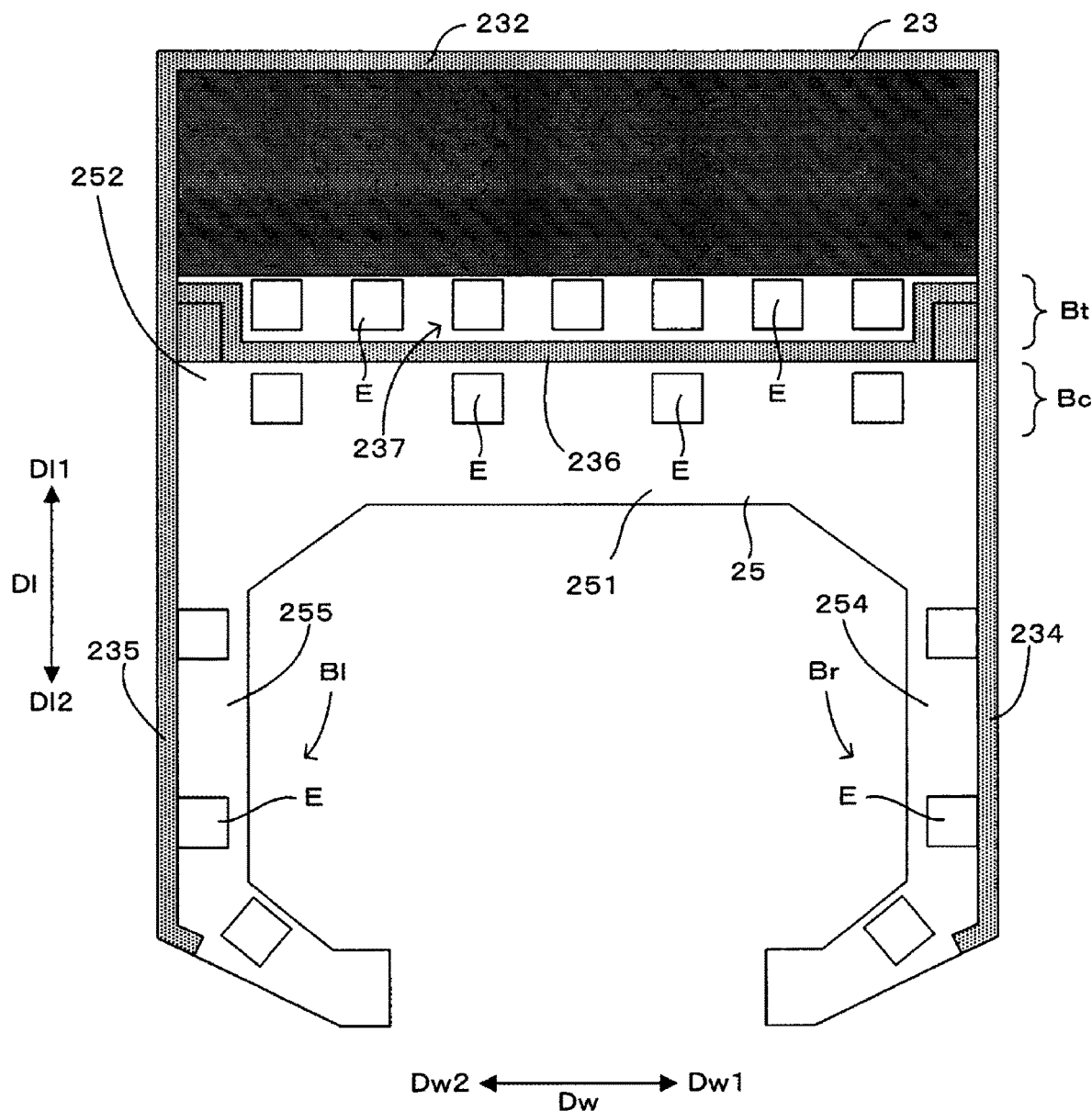
FIG. 5C is a front view schematically illustrating the configurations of the reflector and the illumination substrate attached to each other.

The illumination substrate 25 faces the reflector 23 from the rear side Sb in the front-rear direction Dfs (FIG. 5C). FIG. 5C is a front view schematically illustrating the configurations of the reflector and the illumination substrate attached to each other. As illustrated in FIG. 5C, the respective light sources E arrayed in the top light source region Bt are located on the one side Dl1 of the partition plate 236 in the length direction Dl and face the slit 237, while the light sources E arrayed in the center light source region Bc are located on the other side Dl2 of the partition plate 236 in the length direction Dl. Therefore, the partition plate 236 prevents light emitted from each of the light sources E in the center light source region Bc from entering a path of light emitted from each of the light sources E in the top light source region Bt. In addition, the partition plate 236 prevents the light emitted from each of the light sources E in the top light source region Bt from entering a path of the light emitted from each of the light sources E in the center light source region Bc.

Figure 5D:
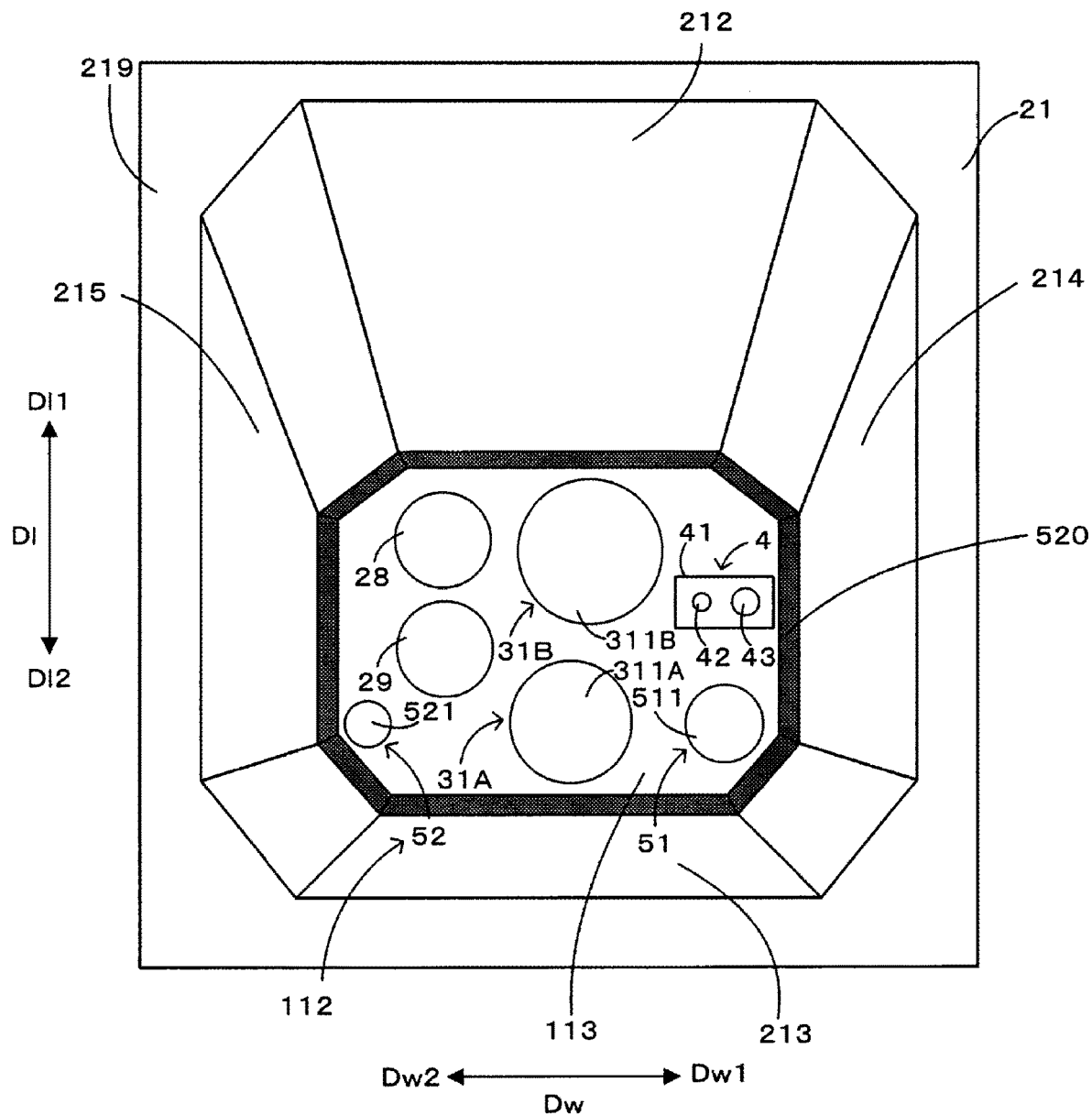
FIG. 5D is a front view schematically illustrating configurations of a diffuser and an arrangement panel.
Figure 5E:
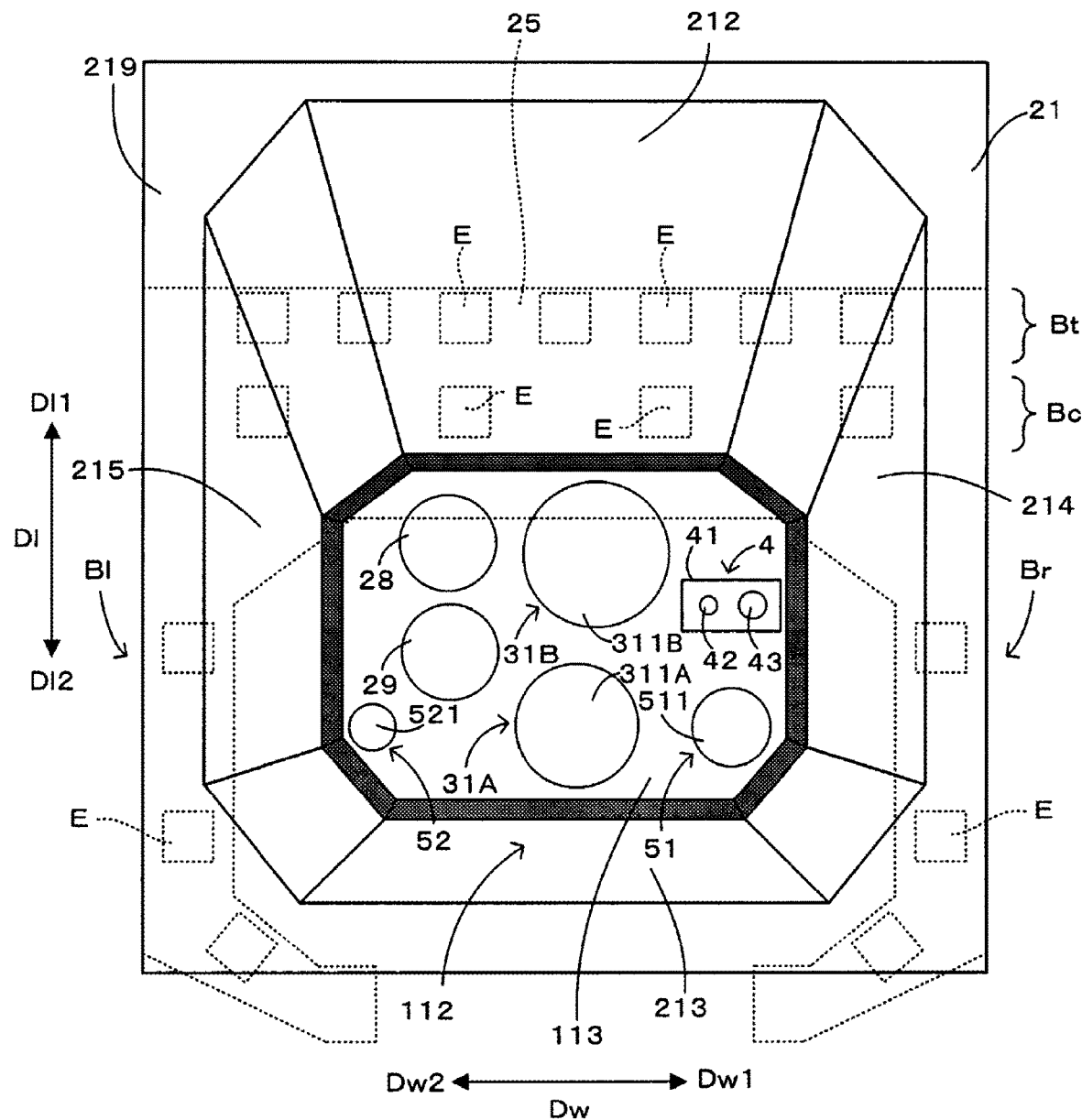
FIG. 5E is a front view schematically illustrating the diffuser and the illumination substrate hidden by the diffuser in an overlapping manner.
Figure 5F:
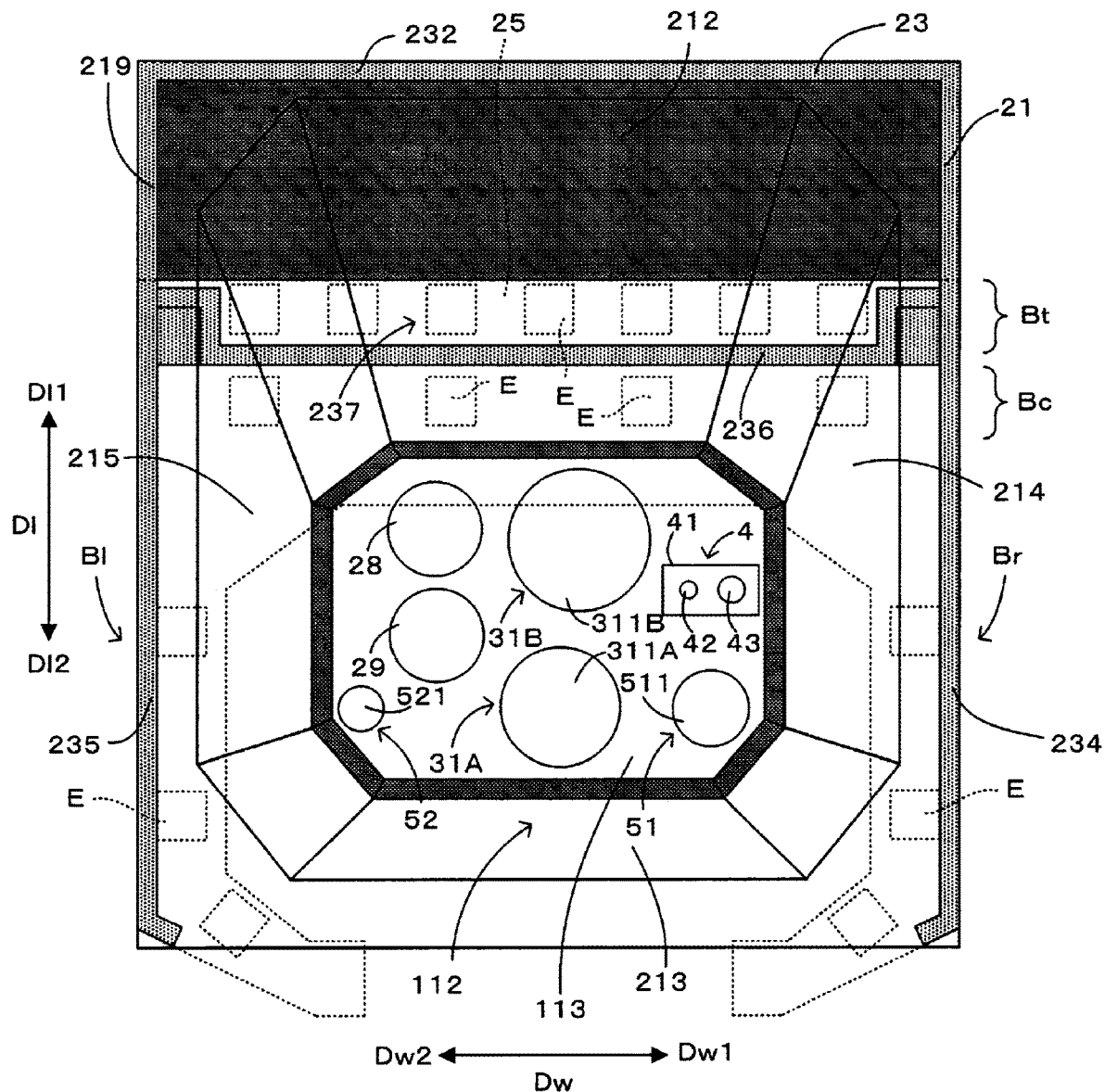
FIG. 5F is a front view schematically illustrating the reflector further overlapping the diffuser and the illumination substrate of FIG. 5E.

FIG. 5D is a front view schematically illustrating configurations of the diffuser and the arrangement panel, FIG. 5E is a front view schematically illustrating the diffuser and the illumination substrate hidden by the diffuser in an overlapping manner, and FIG. 5F is a front view schematically illustrating the reflector further overlapping the diffuser and the illumination substrate in FIG. 5E. In FIGS. 5E and 5F, the illumination substrate 25 is indicated by a broken line.

As described above, the arrangement panel 113 is provided at the end on the rear side Sb of the opening 112. The top diffusion plate 212 of the diffuser 21 is located on the one side Dl1 of the arrangement panel 113 in the length direction Dl, the bottom diffusion plate 213 is located on the other side Dl2 of the arrangement panel 113 in the length direction Dl, the right diffusion plate 214 is located on the one side Dw1 of the arrangement panel 113 in the width direction Dw, and the left diffusion plate 215 is located on the other side Dw2 of the arrangement panel 113 in the width direction Dw.

As can be seen from FIG. 5E, the light emitted from the light source E in the top light source region Bt or the center light source region Bc mainly enters the top diffusion plate 212. Furthermore, as can be seen from FIG. 5F, the light emitted from the light source E in the top light source region Bt passes through the one side Dl1 of the partition plate 236 and enters the top diffusion plate 212, and the light emitted from the light source E in the center light source region Bc passes through the other side Dl2 of the partition plate 236 and enters the top diffusion plate 212. In addition, light emitted from the light source E in the right light source region Br mainly enters the right diffusion plate 214, and light emitted from the left light source region Bl mainly enters the left diffusion plate 215. The top diffusion plate 212, the right diffusion plate 214, and the left diffusion plate 215 have light diffusibility, and the top diffusion plate 212, the right diffusion plate 214, and the left diffusion plate 215 diffuse beams of light incident from the light sources E, respectively, so that the surface Wf of the workpiece W is irradiated with the uniform diffuse light. Note that a light absorption region 520 (a hatched range in FIGS. 5D and 5E), adjacent to the arrangement panel 113, in each of the top diffusion plate 212, the bottom diffusion plate 213, the right diffusion plate 214, and the left diffusion plate 215 is painted in black or is made of a black material, and details thereof will be described later.

That is, the light emitted from the light source E in the top light source region Bt is diffused by the top diffusion plate 212, and then emitted as the illumination light Li from the top diffusion plate 212 toward the surface Wf of the workpiece W. The light emitted from the light source E in the center light source region Bc is diffused by the top diffusion plate 212, and then emitted as the illumination light Li from the top diffusion plate 212 toward the surface Wf of the workpiece W. The light emitted from the light source E in the right light source region Br is diffused by the right diffusion plate 214, and then emitted as the illumination light Li from the right diffusion plate 214 toward the surface Wf of the workpiece W. The light emitted from the light source E in the left light source region Bl is diffused by the left diffusion plate 215, and then emitted as the illumination light Li from the left diffusion plate 215 toward the surface Wf of the workpiece W. In this manner, the light from the light source E is diffused by the diffuser 21 as passing through the diffuser 21. In addition, the surface Wf of the workpiece W is irradiated with diffuse light, generated by diffusing the light by the diffuser 21, as uniform illumination light Li.

As described above, the top light source region Bt, the center light source region Bc, the right light source region Br, and the left light source region Bl of the diffuser 21 generate beams of the illumination light Li emitted from the diffuser 21 toward the surface Wf of the workpiece W at mutually different angles. On the other hand, the controller 6 that controls the illumination unit 2 can change a lighting region in which light is emitted from the light source E among the top light source region Bt, the center light source region Bc, the right light source region Br, and the left light source region Bl. When the lighting region is changed this manner, it is possible to change an angle at which the diffuse light is made incident on the surface Wf of the workpiece W as the illumination light Li.

The above-described diffuse illumination unit 27 (FIG. 2) is configured using the diffuser 21, a reflector 23, and the illumination substrate 25 as described above. Furthermore, as described above, the illumination unit 2 includes the direct illumination unit 28 that directly irradiates the surface Wf of the workpiece W with the light from the light source without diffusing the light, and the polarized illumination unit 29 that irradiates the surface Wf of the workpiece W with polarized light. As illustrated in FIGS. 5E and 5F, the direct illumination unit 28 and the polarized illumination unit 29 are arranged on the arrangement panel 113.

Therefore, the controller 6 can selectively perform irradiation by "diffuse illumination" in which the light source E of the diffuse illumination unit 27 is turned on to irradiate the workpiece W with the diffuse light, "direct illumination" in which the light source 281 of the direct illumination unit 28 is turned on to irradiate the workpiece W with the light from the light source without diffusion, and "polarized illumination" in which the light source 291 of the polarized illumination unit 29 is turned on to irradiate the workpiece W with the polarized light.

As described above, the imaging unit 3 includes the two cameras 31A and 31B, and these cameras 31A and 31B are provided on the arrangement panel 113. Specifically, as illustrated in FIGS. 5E and 5F, the condenser lens 311A and a condenser lens 311B (objective lenses) of the camera 31A and the camera 31B are provided in the head 11 to correspond to opening portions of the arrangement panel 113. In the length direction Dl, the condenser lens 311B of the camera 31B is located between the condenser lens 311A of the camera 31A and the top diffusion plate 212. The camera 31A collects the reflected light Lr from the surface Wf of the workpiece W on a solid-state imaging element by the condenser lens 311A, and causes the solid-state imaging element to generate the code image Ic. Similarly, the camera 31B collects the reflected light Lr from the surface Wf of the workpiece W on a solid-state imaging element by the condenser lens 311B, and causes the solid-state imaging element to generate the code image Ic. At this time, the camera 31A is a narrow-field camera, whereas the camera 31B is a wide-field camera, and a visual field of the camera 31A is narrower than a visual field of the camera 31B. Therefore, in a case where the number of pixels of an image sensor included in each of the cameras is equal, the resolution of the code image Ic captured by the camera 31A is higher than the resolution of the code image Ic captured by the camera 31B. In general, a size of a direct part marking (DPM) code is smaller than a size of a code attached to a normal label. Therefore, it is preferable to capture an image of the DPM code by the camera 31A having the narrow visual field so as to obtain a code image with high resolution by increasing a ratio of the DPM code accounting for the view field of the camera as much as possible.

In addition, the distance measuring unit 4 is provided on the arrangement panel 113. The distance measuring unit 4 includes a distance sensor 41 of a time of flight (TOF) scheme, and the distance sensor 41 includes a light emitting unit 43 that emits light toward the visual fields of the cameras 31A and 31B and a light receiving unit 42 that detects light returned from the visual fields of the cameras 31A and 31B, and measures a distance to an object (including the workpiece W) present in the visual fields of the cameras 31A and 31B based on a time from the emission of light from the light emitting unit 42 to reception of the light of the light receiving unit 42.

Furthermore, the arrangement panel 113 is provided with an LD emitter 51 and an LED emitter 52 of the aimer emitter 5. Specifically, as illustrated in FIGS. 5E and 5F, a lens 511 of the LD emitter 51 and a lens 521 of the LED emitter 52 are fitted into the arrangement panel 113. In the width direction Dw, the LD emitter 51 (the lens 511) is arranged on the one side Dw1 of the cameras 31A and 31B, and the LED emitter 52 (the lens 521) is arranged on the other side Dw2 of the cameras 31A and 31B.

Figure 6A:
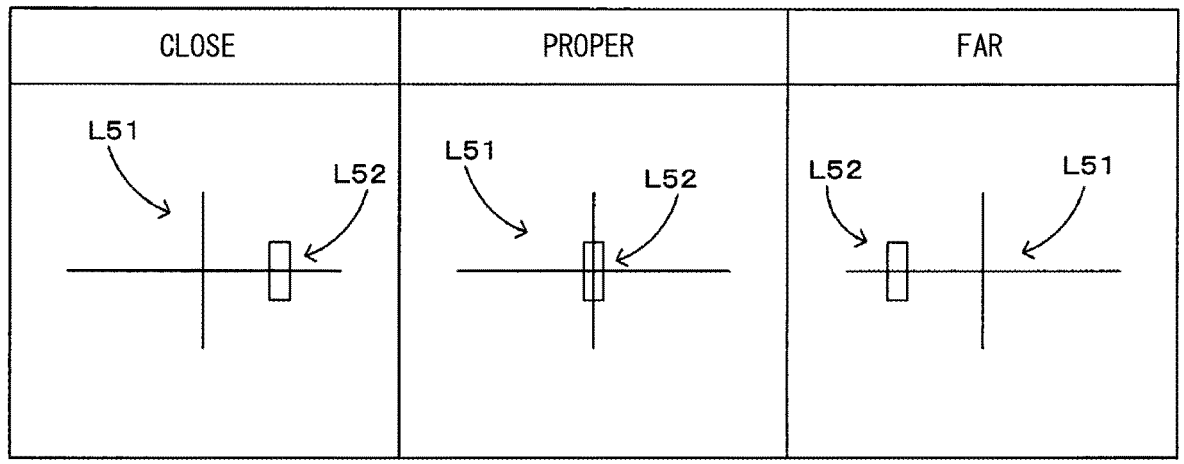
FIG. 6A is a view schematically illustrating an operation of an aimer emitter.

FIG. 6A is a view schematically illustrating an operation of the aimer emitter 5. The LD emitter 51 emits aimer light L51 including two beams of linear visible light intersecting each other at a center point to an object (including the workpiece W) present in the visual field of the camera 31A. The aimer light L51 indicates a predetermined range in the visual field of the camera 31A. In addition, the LED emitter 52 emits with aimer light L52 including substantially rectangular visible light to the object. The aimer emitter 5 indicates a distance to the object by the aimer light L51 and the aimer light L52. For example, the aimer light L51 has a red color, and the aimer light L52 has a green color. When the object is close to the code reading device 1, the aimer light L52 is offset to the one side with respect to the center point of the aimer light L51 as illustrated in a field of "close" in FIG. 6A. When the object is at a proper distance with respect to the code reading device 1, the center point of the aimer light L51 overlaps the aimer light L52 as illustrated in a field of "proper" in FIG. 6A. When the object is far from the code reading device 1, the aimer light L51 is offset to the other side with respect to the center point of the aimer light L52 as illustrated in a field of "far" in FIG. 6A. In particular, the aimer emitter 5 is configured such that the center of the aimer light L51 and the center of the aimer light L52 approach each other as the camera 31A is brought closer to a state of being in focus on the workpiece surface, and the center of the aimer light L51 and the center of the aimer light L52 overlap each other in the state where the camera 31A is in focus on the workpiece surface. That is, the aimer light L51 and the aimer light L52 can indicate that the camera 31A is in the state of being in focus on the workpiece surface and the camera 31A can generate the code image Ic by the overlap between the center of the aimer light L51 and the center of the aimer light L52, and thus, the user can easily grasp a timing at which the good code image Ic can be obtained.

Meanwhile, in a front view, the LD emitter 51 is arranged on the one side Dw1 of the condenser lens 311A, and the LED emitter 52 is arranged on the other side Dw2 of the condenser lens 311A. In order to emit the aimer light L51 and the aimer light L52 into the visual field of the condenser lens 311A in such an arrangement relationship, the LD emitter 51 and the LED emitter 52 respectively emit the aimer light L51 and the aimer light L52 to be inclined in the Dw direction with respect to the optical axis Ac of the condenser lens 311A. That is, the LD emitter 51 emits the aimer light L51 in a direction intersecting the optical axis Ac of the condenser lens 311A such that a beam of the aimer light L51 moves to the other side Dw2 as traveling to the front side Sf (that is, so as to approach the optical axis Ac). In addition, the LED emitter 52 emits the aimer light L52 in a direction intersecting the optical axis Ac of the condenser lens 311A such that a beam of the aimer light L52 moves to the one side Dw1 as traveling to the front side Sf (that is, so as to approach the optical axis Ac). Such a configuration for bending beams of the aimer light L51 and the aimer light L52 as described above will be described next.

Figure 6B:
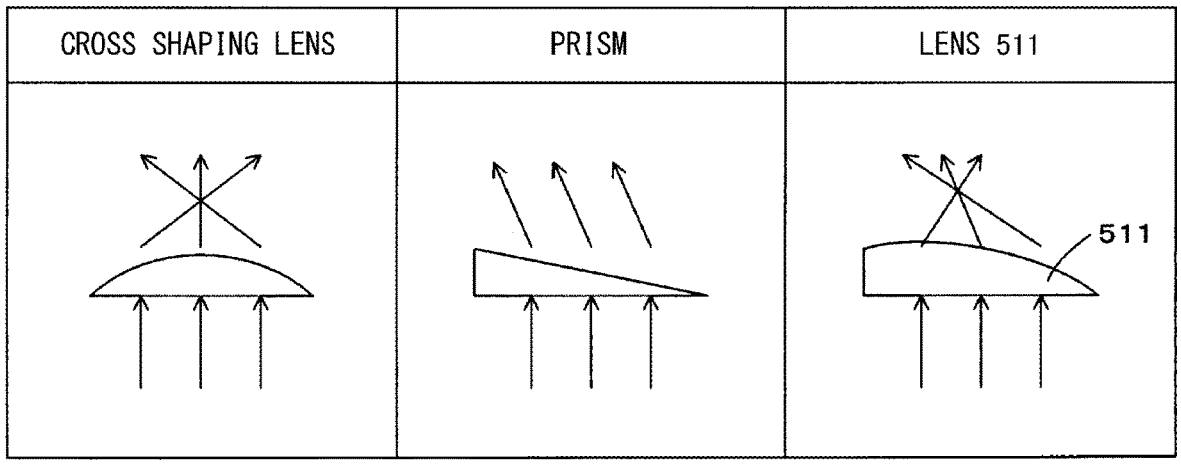
FIG. 6B is a view schematically illustrating a configuration of an LD emitter of the aimer emitter.

FIG. 6B is a view schematically illustrating a configuration of the LD emitter of the aimer emitter. The LD emitter 51 shapes light from a light source which is a laser diode (LD) into a cross shape of L51 by the lens 511, thereby emitting the aimer light L51. The lens 511 has both a function of a lens illustrated in a field of "cross shaping lens"

in FIG. 6B and a function of a prism illustrated in a field of "prism". Here, the function of the cross shaping lens means a function of shaping light incident in parallel to an optical axis of the cross shaping lens into a cross shape, and a traveling direction of a principal ray of a light flux obtained by collecting the light by the cross shaping lens coincides with a traveling direction of the light. In addition, the function of the prism means a function of emitting light, which has been incident at a predetermined incident angle, at an emission angle different from the incident angle. Therefore, the lens 511 having both the function of the cross shaping lens and the function of the prism shapes incident light into a cross shape while refracting the incident light in the direction intersecting an optical axis of the incident light. When the aimer light L51 is emitted to be inclined in the Dw2 direction as described above, it is possible to emit the aimer light L51 to the visual field of the camera 31A corresponding to a central portion, which has good optical characteristics (for example, aberration and the like) of the condenser lens 311A, of the condenser lens 311A of the camera 31A. Note that the aimer light L51 is not particularly limited to the cross shape.

Figure 6C:
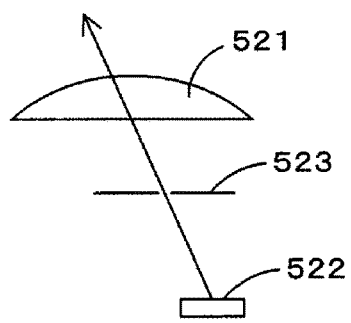
FIG. 6C is a view schematically illustrating a configuration of an LED emitter of the aimer emitter.

FIG. 6C is a view schematically illustrating a configuration of the LED emitter of the aimer emitter. The LED emitter 52 includes the lens 521, a light source 522 which is a light emitting diode (LED), and a diaphragm 523 provided between the lens 521 and the light source 522. The lens 521 is a cross shaping lens, and the lens 521, the diaphragm 523, and the light source 522 are arrayed in a direction intersecting an optical axis of the lens 521. Therefore, the lens 521 collects light entering from the direction intersecting the optical axis of the lens 521 through the diaphragm 523. When the aimer light L52 is emitted to be inclined in the Dw1 direction as described above, it is possible to emit the aimer light L52 to the visual field of the camera 31A corresponding to the central portion, which has good optical characteristics of the condenser lens 311, of the condenser lens 311 of the camera 31A.

Figure 7:
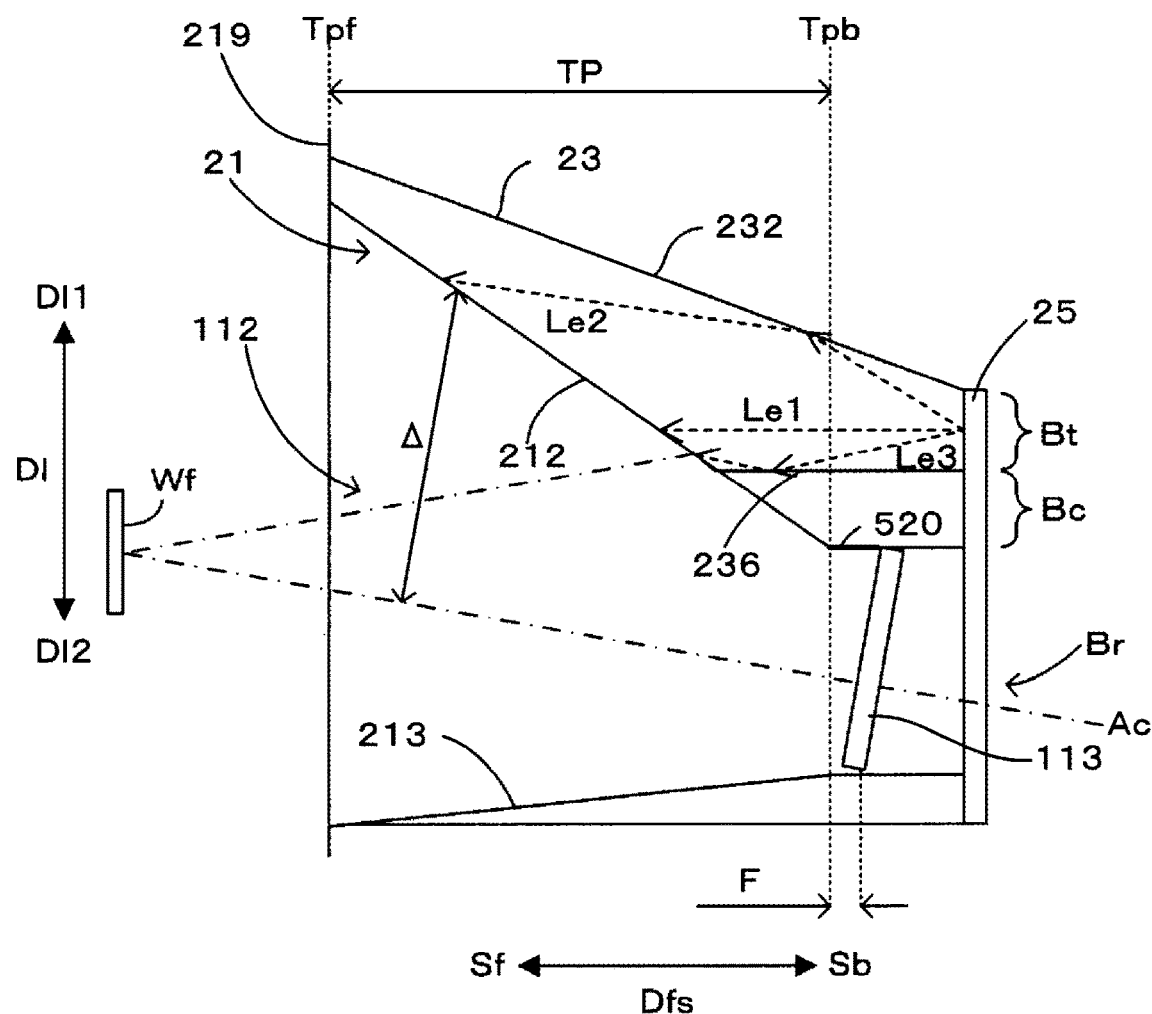
FIG. 7 is a side view schematically illustrating a positional relationship between the reflector and the illumination substrate in a front-rear direction.

FIG. 7 is a side view schematically illustrating a positional relationship between the reflector and the illumination substrate in the front-rear direction. The optical axis Ac illustrated in FIG. 7 is the optical axis Ac of the condenser lens 311A of the camera 31A. As illustrated in FIG. 7, the top diffusion plate 212 has a rear end Tpb that is an end on the rear side Sb and a front end Tpf that is an end on the front side Sf in the front-rear direction Dfs. The top diffusion plate 212 has a shape TP in which a distance Δ from the optical axis Ac increases from the rear end Tpb toward the front end Tpf. Note that the distance between the top diffusion plate 212 and the optical axis Ac can be defined by an interval between the optical axis Ac and the top diffusion plate 212 in a direction orthogonal to the optical axis Ac. The illumination substrate 25 is arranged on the rear side Sb of the rear end Tpb of the shape TP (that is, the top diffusion plate 212) in the front-rear direction Dfs, and the light source E of the illumination substrate 25 emits light from the rear side Sb of the rear end Tpb toward the top diffusion plate 212.

In particular, the light emitted from the light source E in the top light source region Bt passes through the one side Dl1 of the partition plate 236 and reaches the top diffusion plate 212. At this time, light Le1 directly incident on the top diffusion plate 212 from the light source E, light Le2 emitted from the light source E, reflected by an inner wall of the top cover 232, and then incident on the top diffusion plate 212, and light Le3 reflected by an inner wall of the partition plate 236 and then incident on the top diffusion plate 212 pass through the top diffusion plate 212 and are diffused by the top diffusion plate 212. Although not illustrated, the light emitted from the light source E in the center light source region Bc is absorbed by the light absorption region 520 while allowing light directly incident on the top diffusion plate 212 and light reflected by the inner wall of the partition plate 236 to be diffused by the top diffusion plate 212. As described above, the light absorption region 520 suppresses light passing through an offset portion of the diffuser 21 from being stray light with respect to the cameras 31A and 31B.

In addition, as illustrated in FIG. 7, the arrangement panel 113 is arranged to be offset by an offset amount F to the rear side Sb from the rear end Tpb of the tapered shape TP in the front-rear direction Dfs. Therefore, the cameras 31A and 31B, the direct illumination unit 28, the polarized illumination unit 29, the distance sensor 41, the LD emitter 51, and the LED emitter 52 arranged on the arrangement panel 113 are also arranged to be offset to the rear side Sb of the rear end Tpb of the tapered shape TP by the offset amount F. In addition, the arrangement panel 113 is inclined with respect to an end surface of the opening 112 such that a non-parallel arrangement is formed therebetween. As a result, in a state where the end surface of the head 11 (the opening 112) and the workpiece surface Wf are substantially parallel to each other, the optical axis Ac of the camera 31A reflected by the workpiece surface Wf is directed toward the top diffusion plate 212 of the diffuser 21.

Meanwhile, as described above, the controller 6 can selectively perform irradiation by the "diffuse illumination" in which the light source E of the illumination substrate 25 is turned on to irradiate the workpiece W with the diffuse light, the "direct illumination" in which the light source of the direct illumination unit 28 is turned on to irradiate the workpiece W, and the "polarized illumination" in which the light source of the polarized illumination unit 29 is turned on to irradiate the workpiece W. The diffuse illumination, the direct illumination, and the polarized illumination are selectively used as follows, for example.

The direct illumination is used for irradiation to illuminate a code such as a barcode printed on a label. The controller 6 irradiates the surface Wf of the label (the workpiece W) to which the code is attached with light emitted from the direct illumination unit 28 as the illumination light Li, and acquires the code image Ic generated by the wide-field camera 31B. The polarized illumination is also used for irradiation to illuminate a code such as a barcode printed on a label, similarly to the direct illumination. The controller 6 acquires the code image Ic generated by the wide-field camera 31B while irradiating the surface Wf of the label (the workpiece W) to which the code is attached with light emitted by the polarized illumination unit 29 as the illumination light Li. Further, the controller 6 decodes the code image Ic generated based on the direct illumination or the polarized illumination to generate a decoding result Rd.

Figure 8:
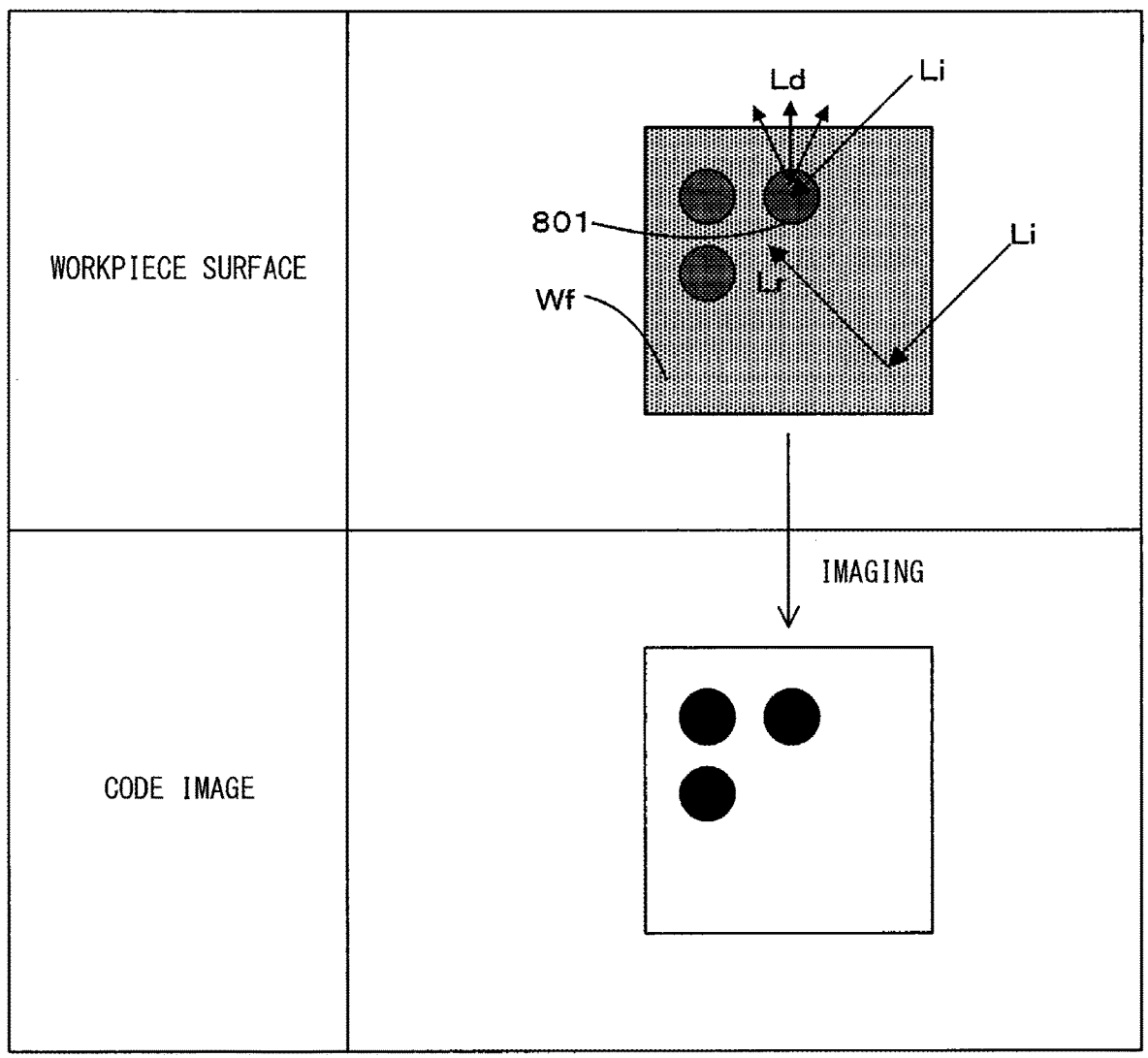
FIG. 8 is a view schematically illustrating a code attached to a workpiece surface of a specular workpiece and a code image obtained by capturing an image of the code by the code reading device.

The diffuse illumination is used for irradiation to illuminate a code (DPM code) attached to the surface Wf of the specular workpiece W by direct part marking (DPM). The controller 6 irradiates the surface Wf of the workpiece W to which the DPM code is attached with the diffuse light, emitted from the illumination substrate 25 and then diffused by the diffuser 21, as the illumination light Li, and acquires the code image Ic generated by the narrow-field camera 31A. At this time, in a state where the camera 31A is in focus on the surface Wf of the workpiece W, the camera 31A collects the reflected light Lr specularly reflected from the surface Wf of the workpiece W by the condenser lens 311A and receives the light by the solid-state imaging element, thereby generating the code image Ic. In other words, a position and an angle of the diffuser 21 with respect to the camera 31A are fixed so as to enable execution of such an operation. As illustrated in FIG. 8, since the illumination light Li is diffused in recesses provided in the specular surface Wf, that is, dots 801 of the DPM code, and is specularly reflected (specularly reflected) on the surface Wf other than the dots 801, diffuse light Ld is reflected from the dots 801, and the specularly reflected light Lr is reflected from the surface Wf other than the dots 801. Therefore, the code image Ic is a code image in which a luminance value of a portion 811 corresponding to the DPM code (for example, the dots 801) is lower than a luminance value of a portion 812 corresponding to the surface Wf of the workpiece W. Further, the controller 6 decodes the code image Ic generated based on the diffuse illumination to generate the decoding result Rd.

In the embodiment configured as described above, the surface Wf (a workpiece surface) of the workpiece W is irradiated with the illumination light Li generated by diffusing light emitted from the light source E (a first light source) by the diffuser 21, and the reflected light Lr reflected from the surface Wf of the workpiece W is collected by the condenser lens 311A. Further, the camera 31A (a first camera) receives the light collected by the condenser lens 311A by the solid-state imaging element to generate the code image Ic. In addition, the diffuser 21 has the tapered shape TP inclined with respect to the front-rear direction Dfs (the optical axis direction) so as to be separated from the optical axis Ac toward the front side Sf of the optical axis Ac of the condenser lens 311A, and a length of the diffuser 21 is secured in a direction perpendicular to an axis along which the optical axis is reflected from the workpiece surface. In regard to the tapered shape TP of the diffuser 21, the light source E has the following configuration.

That is, the light source E emits light toward the diffuser 21 from a position on the rear side of the rear end Tpb of the tapered shape TP of the diffuser 21 in the front view from the front side Sf in the front-rear direction Dfs. In such a configuration, the light source E emits the light toward the diffuser 21 from a position further on the rear side of the rear end Tpb of the reflector 23 whose length is secured in the direction perpendicular to the axis along which the optical axis is reflected from the workpiece surface. Therefore, it is possible to secure a long distance for traveling of light until the light is emitted from the light source E and then diffused by the diffuser 21. The light source E emits the light toward the diffuser 21 from the back of a rear end (for example, may be the rear end of the tapered shape TP or a rear end of the offset portion) of the diffuser 21 such that the light source E is not reflected on the camera when the camera 31A receives the specularly reflected light. As a result, since the light from the light source E is sufficiently spread at the stage of being incident on the diffuser 21, it is possible to suppress a reflection of the light source E (for example, an outer shape of the light source E and the like) on the specular workpiece surface.

In addition, the illumination substrate 25 in which the plurality of light sources E are arranged is provided, and the illumination substrate 25 is arranged at a position and an angle at which light emitted from each of the plurality of light sources E reaches the diffuser 21.

In particular, the illumination substrate 25 is arranged on the rear side of the rear end Tpb of the tapered shape TP of the diffuser 21 in the front view.

In addition, the illumination substrate 25 includes the substrate 251 formed in an inverted U-shape and including the main substrate portion 252 (an upper region) provided on the upper side of the camera 31A, the right substrate portion 254 (a right region) extending downward from the main substrate portion 252 on the right side of the camera 31A, and the left substrate portion 255 (a left region) extending downward from the main substrate portion 252 on the left side of the camera 31A in the front view. Further, the plurality of light sources E are arrayed across the main substrate portion 252, the right substrate portion 254, and the left substrate portion 255 in the substrate 251. In such a configuration, it is not necessary to provide a space for arranging the light source E on the lower side of the camera 31A. Therefore, it is possible to downsize the code reading device 1 while securing a space for the diffuser 21 on the upper side of the camera 31A to increase an area of the diffuser 21 (particularly the top diffusion plate 212).

In addition, the reflector 23 (a reflective frame) that covers a gap between the illumination substrate 25 and the diffuser 21 and reflects light is provided, and the diffuser 21 emits diffuse light obtained by diffusing the light Le1 emitted from the plurality of light sources E and directly incident on the diffuser 21 without being reflected by the reflector 23, diffuse light obtained by diffusing the light Le2 emitted from the plurality of light sources E and reflected by the reflector 232, and the light Le3 reflected by the partition plate 236 toward the surface Wf of the workpiece W. In such a configuration, the uniformity of light diffused by the diffuser 21 can be further improved.

In addition, the LD emitter 51 (a first aimer) that emits the aimer light L51 (first aiming light) indicating a predetermined range in the visual field of the camera 31A to the surface Wf of the workpiece W and the LED emitter 52 (a second aimer) that emits the aimer light L51 (second aiming light) indicating a distance to the surface Wf of the workpiece W according to a positional relationship with the aimer light L52 to the surface Wf of the workpiece W are provided. Further, as a difference between a distance between the condenser lens 311A and the surface Wf of the workpiece W and a focal length of the condenser lens 311A decreases, the aimer light L52 is closer to the center of the aimer light L51, and the aimer light L52 is emitted to the center of the aimer light L51 in a state where a focal point of the condenser lens 311A coincides with the surface Wf of the workpiece W. In such a configuration, the user can accurately place the focus of the condenser lens 311A to be on the surface Wf of the workpiece W by operating the code reading device 1 while visually recognizing the positional relationship between the aimer light L51 and the aimer light L52.

In addition, a wavelength (a wavelength of a red color) of the aimer light L51 is different from a wavelength (a wavelength of a green color) of the aimer light L52. In such a configuration, it is possible to easily distinguish between the aimer light L51 and the aimer light L52, and it is possible to improve the operability of the user.

In addition, the LD emitter 51 and the LED emitter 52 are arranged on lateral sides of the condenser lens 311A in the front view. In such an arrangement relationship, in order to emit each of the aimer light L51 and the aimer light L52 to the central portion of the visual field of the camera 31A, the LD emitter 51 emits the aimer light L51 in a direction intersecting the optical axis Ac of the condenser lens 311A, and the LED emitter 52 emits the aimer light L52 in a direction intersecting the optical axis Ac of the condenser lens 311A. In such a configuration, the user operates the code reading device 1 while visually recognizing the positional relationship between the aimer light L51 and the aimer light L52, so that it is possible to align a portion (the central portion) of the condenser lens 311A having good optical characteristics with the code.

In addition, the LD emitter 51 includes the lens 511 having the action of a cross shaping lens and the action of a prism. Further, the direction in which the aimer light L51 is emitted is refracted to the direction intersecting the optical axis Ac of the condenser lens 311A by the action of the prism of the lens 511. In such a configuration, the lens 511 having the action of the cross shaping lens also has the action of the prism and refracts the light to the direction intersecting the optical axis Ac of the condenser lens 311A, and thus, the code reading device 1 can be downsized.

In addition, the diffuser 21 has a back surface (a textured surface) subjected to roughening, and light is diffused by the back surface as passing through the back surface. In such a configuration, the uniformity of light diffused by the diffuser 21 can be further improved.

In addition, the direct illumination unit 28 that includes the light source 281 (a second light source) and irradiates the surface Wf of the workpiece W with light emitted from the light source 281 without being diffused, and the camera 31B that receives the light emitted from the direct illumination unit 28 and then reflected by the surface Wf of the workpiece W to generate the code image Ic. Further, the camera 31A is arranged on the other side Dl2 (on the lower side) of the camera 31B in the front view. In addition, in the diffuser 21, the top diffusion plate 212 that diffuses light emitted from the light source E (the first light source) in the top light source region Bt or the center light source region Bc is arranged on the one side Dl1 (the upper side) of the camera 31B. In such a configuration, in the front view, the camera 31B is provided between the camera 31A and the top diffusion plate 212 (a diffusion region) of the diffuser 21 that diffuses the light emitted from the light source E (the first light source) in the top light source region Bt or the center light source region Bc. In other words, a wide interval between the top diffusion plate 212 and the camera 31A is secured. Therefore, it is possible to increase an area ratio of the top diffusion plate 212 to the visual field of the camera 31A when the top diffusion plate 212 is viewed from the camera 31A through the surface Wf of the workpiece W functioning as a mirror surface. As a result, a size of the diffuser 21 can be relatively reduced, and thus, the device itself can be downsized.

In addition, the rear end Tpb (FIG. 7) of the diffuser 21 is arranged to be offset to the front side with respect to the condenser lens 311A in the front-rear direction Dfs or the optical axis direction. As a result, the diffuser 21 can be brought closer to the workpiece side, and thus, a planarity ratio of the top diffusion plate 212 to the visual field of the camera 31A can be increased, and the DPM code can be easily read in a bright-field manner. In such a configuration, the light absorption region 520 is provided in the offset portion in order to suppress light passing through the offset portion of the diffuser 21 from being stray light with respect to the cameras 31A and 31B. In addition, an antireflection coating may be applied to the condenser lens in order to prevent the stray light.

As described above, in the present embodiment, the code reading device 1 corresponds to an example of the "code reading device" of the invention, the surface Wf corresponds to an example of the "workpiece surface" of the invention, the workpiece W corresponds to an example of the "workpiece" of the invention, the light sources E in the top light source region Bt and the center light source region Bc correspond to an example of the "first light source" of the invention, the condenser lens 311A corresponds to an example of the "condenser lens" of the invention, the camera 31A corresponds to an example of the "first camera" of the invention, the optical axis Ac of the condenser lens 311A corresponds to an example of the "optical axis" of the invention, the front-rear direction Dfs corresponds to an example of the "optical axis direction" of the invention, the tapered shape TP corresponds to an example of the "inclined shape" of the invention, the diffuser 21 corresponds to an example of the "diffuser" of the invention, the head 11 corresponds to an example of the "head" of the invention, the illumination substrate 25 corresponds to an example of the "illumination substrate" of the invention, the main substrate portion 252 corresponds to an example of the "upper region" of the invention, the right substrate portion 254 corresponds to an example of the "right region" of the invention, the left substrate portion 255 corresponds to an example of the "left region" of the invention, the substrate 251 corresponds to an example of the "light source arrangement portion" of the invention, the reflector 23 corresponds to an example of the "reflective frame" of the invention, the aimer light L51 corresponds to an example of the "first aiming light" of the invention, the LD emitter 51 corresponds to an example of the "first aimer" of the invention, the aimer light L52 corresponds to an example of the "second aiming light" of the invention, the LED emitter 52 corresponds to an example of the "second aimer" of the invention, the direct illumination unit 28 corresponds to an example of the "direct illumination unit" of the invention, and the camera 31B corresponds to an example of the "second camera" of the invention.

Note that the invention is not limited to the above-described embodiment and various modifications can be made to those described above without departing from the gist thereof. For example, in order to reduce light emitted as non-polarized light by being diffused by the left diffusion plate 215 at the time of irradiation of polarized illumination by the polarized illumination unit 29, a part (for example, an end portion on the front side Sf) of the left diffusion plate 215 may be finished in black to absorb the polarized illumination.

Figure 9:
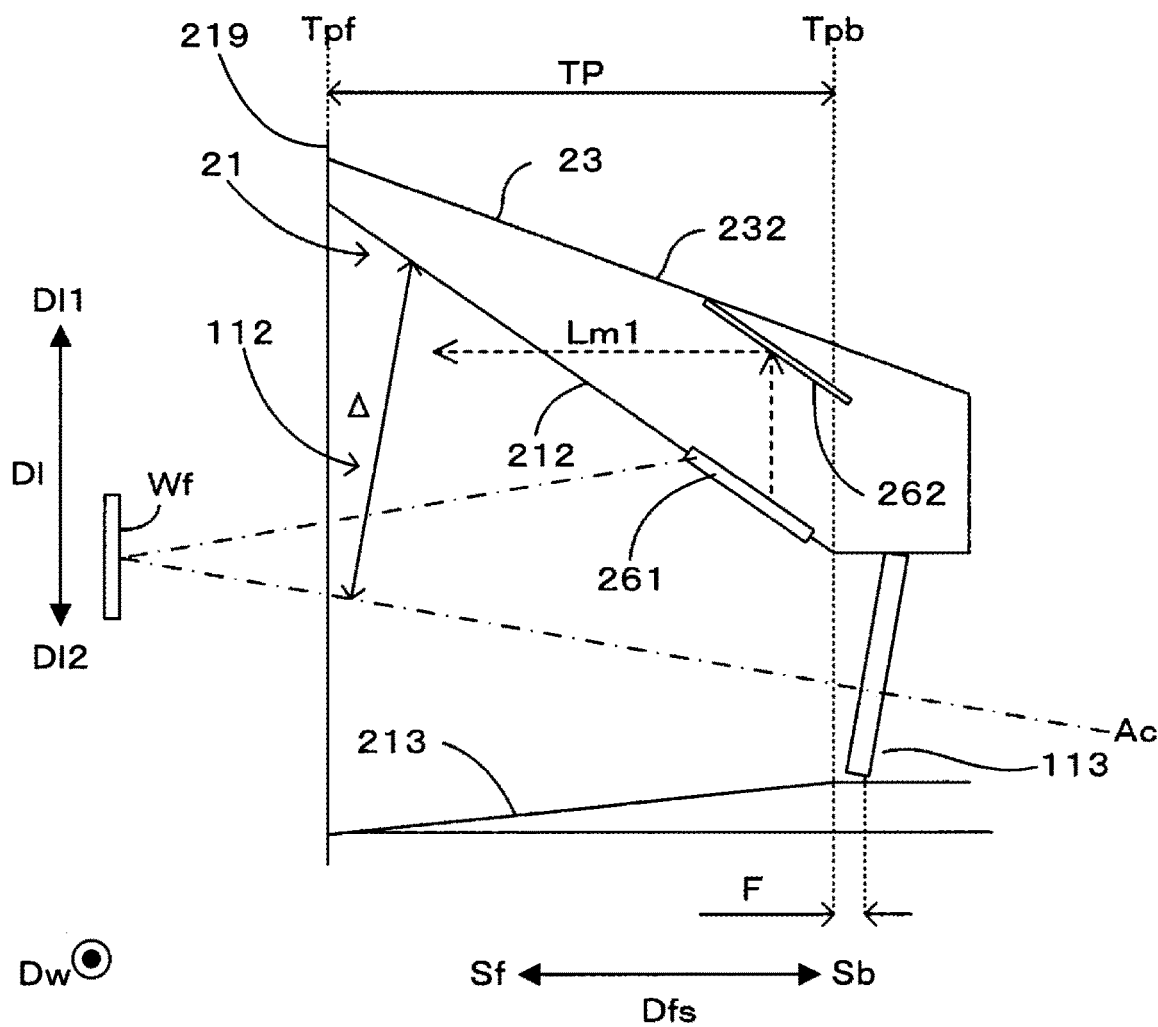
FIG. 9 is a side view schematically illustrating a first modified example of the code reading device.
Figure 10:
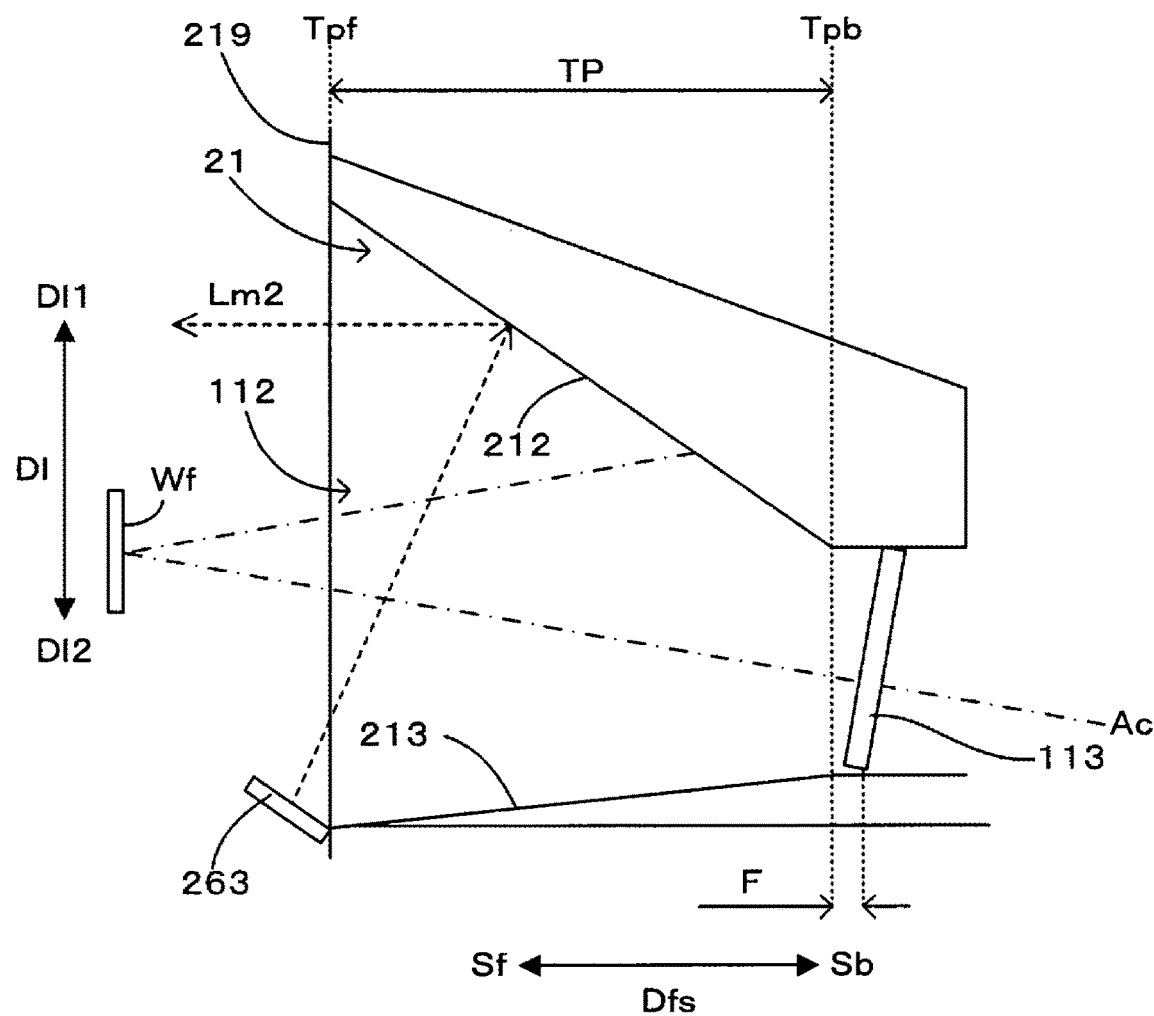
FIG. 10 is a side view schematically illustrating a second modified example of the code reading device.

In addition, an arrangement relationship between the diffuser 21 and the light source E can be appropriately changed as illustrated in FIG. 9 or 10.

FIG. 9 is a side view schematically illustrating a first modified example of the code reading device. In the first modified example, a pair of the illumination substrates 261 is arranged adjacent to the top diffusion plate 212 so as to sandwich the top diffusion plate 212 (a diffuser) from the width direction Dw, and the light source E is provided in each of the illumination substrates 261. In addition, a reflective mirror 262 is provided so as to face the top diffusion plate 212 from the rear side Sb. Further, the light source E of the illumination substrate 261 emits light toward the reflective mirror 262. The light emitted from the light source E is reflected by the reflective mirror 262 toward the top diffusion plate 212 and is transmitted through the top diffusion plate 212 (light Lm1 in FIG. 9). The light Lm1 is diffused as being transmitted through the top diffusion plate 212, and is emitted to the surface Wf of the workpiece W as diffuse light. That is, the present modified example is configured such that the diffuser is irradiated with the light through a reflector provided on an optical path between the light source and the diffuser such that the light source is not reflected on the camera 31A when the camera 31A receives specularly reflected light.

That is, in the first modified example, the light source E (a first light source) emits light toward the reflective mirror 262 (a reflector) arranged so as to face the top diffusion plate 212 (the diffuser) from the rear side Sb in the front view, and causes the light reflected by the reflective mirror 262 to be incident on the top diffusion plate 212. As described above, the light emitted from the light source E enters the top diffusion plate 212 via the reflective mirror 262. Therefore, it is possible to secure a long distance for traveling of light until the light is emitted from the light source E and then diffused by the top diffusion plate 212. As a result, it is possible to suppress a reflection of the light source E in the light emitted from the light source E and diffused by the top diffusion plate 212.

FIG. 9 is a side view schematically illustrating a second modified example of the code reading device. In the second modified example, the light source E is provided on the front side Sf of the top diffusion plate 212, instead of providing the light source E on the rear side Sb of the top diffusion plate 212 in the front-rear direction Dfs. Specifically, an illumination substrate 263 is arranged on the front side Sf of the top diffusion plate 212, and the light source E is provided on the illumination substrate 263. Further, the light source E of the illumination substrate 263 emits light toward a surface on the front side Sf of the top diffusion plate 212. The light emitted from the light source E is diffused by the top diffusion plate 212, and a part of the light travels to the front side Sf (light Lm2 in FIG. 9). The light Lm2 is diffused as being reflected by the top diffusion plate 212, and is emitted to the surface Wf of the workpiece W as diffuse light. That is, in the present modified example, light is emitted from the front of a diffuser toward the diffuser such that the light source is not reflected on the camera 31A when the camera 31A receives specularly reflected light. Note that the illumination substrate 263 may be arranged on the bottom diffusion plate 213.

That is, in the second modified example, the light source E (a first light source) irradiates the top diffusion plate 212 with light from the front side Sf of the top diffusion plate 212 (a diffuser) in a front view. In such a configuration, the light reflected and diffused by a surface (a front surface) on the front side Sf of the top diffusion plate 212 is emitted from the top diffusion plate 212. As a result, it is possible to suppress a reflection of the light source E in the light emitted from the light source E and diffused by the top diffusion plate 212.

The invention is applicable to all techniques for irradiating a workpiece surface, provided with a code, with light and receiving the light reflected from the workpiece surface by a camera to generate a code image.

What is claimed is:

1. A portable code reading device that generates a code image by irradiating a specular workpiece surface to which a code is attached with planar light, receiving light specularly reflected by the workpiece surface, and diffusing and reflecting light emitted to a portion corresponding to the code, the portable code reading device comprising:
   a first light source;
   a condenser lens that collects light reflected by the workpiece surface;
   a first camera that receives the light collected by the condenser lens and generates the code image; and
   a diffuser having an inclined shape that gradually expands as a distance from the first camera increases, the diffuser diffusing light emitted from the first light source to emit diffuse light toward the workpiece surface, wherein
   a position and an angle of the diffuser are fixed with respect to the first camera to allow the first camera to receive the specularly reflected light from the workpiece surface in a state where the first camera is in focus on the workpiece surface, and
   the first light source emits the light toward the diffuser from a back or a front of a rear end of the diffuser or irradiates the diffuser with the light via a reflector provided on an optical path between the first light source and the diffuser to prevent the light source from being imaged on the first camera when the first camera receives the specularly reflected light.

2. The portable code reading device according to claim 1, further comprising an illumination substrate on which a plurality of light sources including the first light source is arranged, wherein
   the illumination substrate is arranged at a position and an angle at which light emitted from each of the plurality of light sources reaches the diffuser.

3. The portable code reading device according to claim 2, wherein the illumination substrate is arranged on a rear side of the rear end of the inclined shape of the diffuser in a front view.

4. The portable code reading device according to claim 3, wherein
   the illumination substrate includes, in the front view, a light source arrangement portion formed in an inverted U-shape and having an upper region provided on an upper side of the first camera, a right side region extending downward from the upper region on a right side of the first camera, and a left side region extending downward from the upper region on a left side of the first camera, and
   the plurality of light sources are arranged in the light source arrangement portion and include a light source arranged in the right region, a light source arranged in the upper region, and a light source arranged in the left region.

5. The portable code reading device according to claim 2, further comprising a reflective frame that covers a gap between the illumination substrate and the diffuser and reflects light, wherein
   the diffuser emits diffuse light, obtained by diffusing light emitted from the plurality of light sources and directly incident on the diffuser without being incident on the reflective frame, and diffuse light, obtained by diffusing light emitted from the plurality of light sources and then reflected by the reflective frame, toward the workpiece surface.

6. The portable code reading device according to claim 1, further comprising:
   a first armor that emits first aiming light indicating a predetermined range in a visual field of the first camera to the workpiece surface; and
   a second aim that emits second aiming light indicating a distance to the workpiece surface based on a positional relationship with the first aiming light to the workpiece surface, wherein
   a distance between a center of the first aiming light and a center of the second aiming light decreases as the first camera is brought closer to a state of being in focus on the workpiece surface, and
   the first aimer and the second aimer overlap the center of the first aiming light and the center of the second aiming light to indicate that the first camera is in the state of being in focus on the workpiece surface and the first camera receives the specularly reflected light from the workpiece surface.

7. The portable code reading device according to claim 6, wherein a wavelength of the first aiming light is different from a wavelength of the second aiming light.

8. The portable code reading device according to claim 6, wherein
the first aimer and the second aimer are arranged on later sides of the condenser lens in the front view,
the first aimer emits the first aiming light in a direction intersecting an optical axis of the condenser lens, and
the second aimer emits the second aiming light in a direction intersecting the optical axis of the condenser lens.

9. The portable code reading device according to claim 8, wherein the first aimer includes a lens having an action of a prism, and refracts a direction in which the first aiming light is emitted to the direction intersecting the optical axis of the condenser lens by the action of the prism of the lens.

10. The portable code reading device according to claim 1, wherein the diffuser has a textured surface subjected to roughening, and light is diffused by the textured surface as the light passes through the textured surface.

11. The portable code reading device according to claim 1, further comprising:
a direct illumination unit that includes a second light source and irradiates the workpiece surface with light emitted from the second light source without being diffused; and
a second camera that receives light emitted by the direct illumination unit and then reflected by the workpiece surface to generate the code image, wherein
the first camera is arranged on a lower side of the second camera in a front view, and
a region of the diffuser that diffuses the light emitted from the first light source is arranged on an upper side of the second camera.

12. The portable code reading device according to claim 1, wherein the rear end of the diffuser is arranged to be offset to a front side with respect to the condenser lens in the optical axis direction.

13. A code reading method for generating a code image by irradiating a specular workpiece surface to which a code is attached with planar light, receiving light specularly reflected by the workpiece surface, and diffusing and reflecting light emitted to a portion corresponding to the code, the code reading method comprising:
a step of causing light emitted from a first light source to be incident on a diffuser;
a step of causing the diffuser to diffuse the light;
a step of irradiating the workpiece surface with the light diffused by the diffuser;
a step of collecting, by a condenser lens, the light reflected by the workpiece surface; and
a step of receiving the light collected by the condenser lens to generate the code image, wherein
the diffuser has an inclined shape that gradually expands as a distance from the first camera increases, and diffuses the light emitted from the first light source to emit diffuse light toward the workpiece surface,
a position and an angle of the diffuser are fixed with respect to the first camera to allow the first camera to receive the specularly reflected light from the workpiece surface in a state where the first camera is in focus on the workpiece surface, and
the first light source emits the light toward the diffuser from a back or a front of a rear end of the diffuser or irradiates the diffuser with the light via a reflector provided on an optical path between the first light source and the diffuser to prevent the light source from being reflected on the first camera when the first camera receives the specularly reflected light.

* * * * *